(12) United States Patent
Webster et al.

(10) Patent No.: US 11,978,355 B2
(45) Date of Patent: *May 7, 2024

(54) MOVEMENT BASED FITNESS AND FITNESS PRODUCT MANAGEMENT

(71) Applicant: Asensei, Inc., San Francisco, CA (US)

(72) Inventors: Steven Webster, San Francisco, CA (US); Ross Arnott, Edinburgh (GB); William Burgar, Hertfordshire (GB)

(73) Assignee: Asensei, Inc, San Francisco, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/719,063

(22) Filed: Apr. 12, 2022

(65) Prior Publication Data
US 2023/0005384 A1    Jan. 5, 2023

Related U.S. Application Data

(63) Continuation of application No. 16/519,647, filed on Jul. 23, 2019, now Pat. No. 11,302,214, which is a continuation of application No. 14/987,995, filed on Jan. 5, 2016, now Pat. No. 10,360,811.

(60) Provisional application No. 62/100,436, filed on Jan. 6, 2015.

(51) Int. Cl.
*G09B 19/00* (2006.01)
*G06Q 30/0251* (2023.01)

(52) U.S. Cl.
CPC ..... *G09B 19/0038* (2013.01); *G06Q 30/0251* (2013.01)

(58) Field of Classification Search
CPC ........................ G09B 19/0038; G06Q 30/0251

USPC ........................................................ 434/247
See application file for complete search history.

(56) References Cited

U.S. PATENT DOCUMENTS

| | | | |
|---|---|---|---|
| 7,264,554 B2 | 9/2007 | Bentley | |
| 7,698,101 B2 | 4/2010 | Alten et al. | |
| 7,905,815 B2 | 3/2011 | Ellis et al. | |
| 8,425,292 B2 | 4/2013 | Lui et al. | |

(Continued)

FOREIGN PATENT DOCUMENTS

| | | |
|---|---|---|
| WO | 2009112281 | 9/2009 |
| WO | 2011086466 | 7/2011 |

OTHER PUBLICATIONS

Harms, Holger, et al., "Estimating Posture-Recognition Performance in Sensing Garments Using Geometric Wrinkle Modeling", IEEE Transactions on Information Technology in Biomedicine, vol. 14, No. 6, Sep. 27, 2010, pp. 1436-1445.

(Continued)

*Primary Examiner* — Robert P Bullington
(74) *Attorney, Agent, or Firm* — Sheppard, Mullin, Richter & Hampton LLP

(57) ABSTRACT

Raw motion data generated by sensors affixed to a user performing exercises or poses in response to perceiving content annotated with a motion track and presented to the user, the motion track generated using a posture dictionary is collected. The exercises or poses are determined from the raw motion data using the posture dictionary. Motion data indicating the exercises or poses within the raw motion data is generated using the raw motion data. The user is graded in performing the exercises or poses by comparing the motion data with the motion track. The content is presented to the user based on the grading of the user.

21 Claims, 10 Drawing Sheets

(56) References Cited

U.S. PATENT DOCUMENTS

| | | |
|---|---|---|
| 11,302,214 B2* | 4/2022 | Webster ............ G06Q 30/0251 |
| 2007/0247306 A1 | 10/2007 | Case, Jr. |
| 2009/0143199 A1 | 6/2009 | Nishibayashi |
| 2010/0173276 A1 | 7/2010 | Vasin |
| 2012/0133655 A1 | 5/2012 | Kristjansson |
| 2014/0188257 A1 | 7/2014 | Ura et al. |
| 2016/0023043 A1 | 1/2016 | Grundy |

OTHER PUBLICATIONS

International Application No. PCT/US2016/012372, International Search Report and Written Opinion dated Mar. 21, 2016.

* cited by examiner

MOVEMENT BASED FITNESS AND FITNESS PRODUCT MANAGEMENT

CROSS-REFERENCE TO RELATED APPLICATIONS

This application is a continuation of U.S. patent application Ser. No. 16/519,647, filed Jul. 23, 2019, entitled "MOVEMENT BASED FITNESS AND FITNESS PRODUCT MANAGEMENT," now U.S. Pat. No. 11,302,214, which is a continuation of U.S. patent application Ser. No. 14/987,995, filed Jan. 5, 2016, entitled "MOVEMENT BASED FITNESS AND FITNESS PRODUCT MANAGEMENT," now U.S. Pat. No. 10,360,811, which claims the benefit of U.S. Patent Provisional Application No. 62/100,436, filed on Jan. 6, 2015, entitled "MOVEMENT BASED FITNESS AND FITNESS PRODUCT MANAGEMENT," which are hereby incorporated by reference.

BACKGROUND

An area of ongoing research and development is in fitness management. In particular as various forms of exercise are continuously developed, there exists a need for systems for coaching user in the various forms of exercise.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In various implementations, raw motion data generated by sensors affixed to a user performing exercises or poses in response to perceiving content annotated with a motion track and presented to the user, the motion track generated using a posture dictionary is collected. Further, in various implementations, the exercises or poses are determined from the raw motion data using the posture dictionary. In various implementations, motion data indicating the exercises or poses within the raw motion data is generated using the raw motion data. Additionally, in various implementations, the user is graded in performing the exercises or poses by comparing the motion data with the motion track. In various implementations, the content is presented to the user based on the grading of the user.

These and other advantages will become apparent to those skilled in the relevant art upon a reading of the following descriptions and a study of the several examples of the drawings.

DETAILED DESCRIPTION

Figure 1:
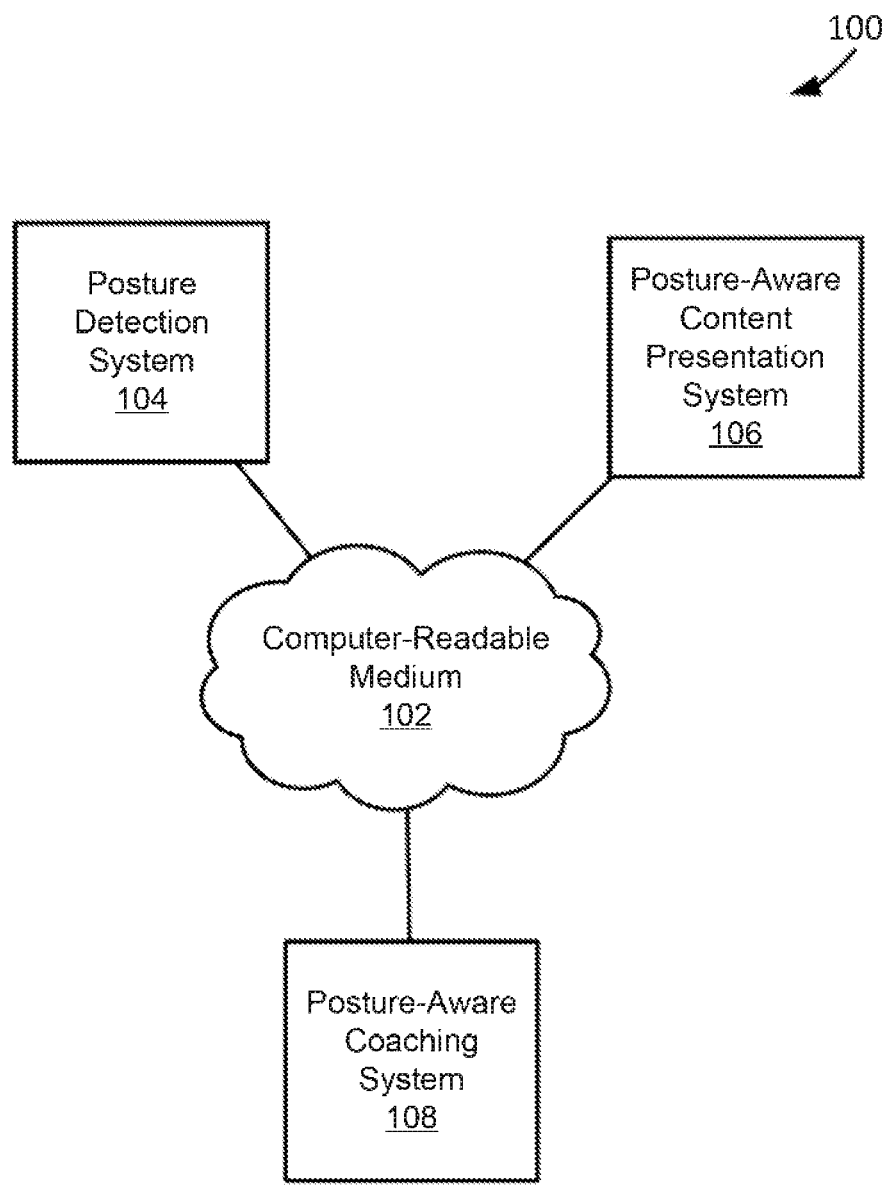
FIG. 1 depicts a diagram of an example of a system for analyzing and providing content according to movement of a user.

FIG. 1 depicts a diagram 100 of an example of a system for analyzing and providing content according to movement of a user. The system of the example of FIG. 1 includes a computer-readable medium 102, a posture detection system 104 coupled to the computer-readable medium 102, a posture-aware content presentation system 106 coupled to the computer-readable medium 102, and a posture-aware coaching system 108 coupled to the computer-readable medium 102.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable. As used in this paper, a "computer-readable medium" is intended to include statutory (e.g., in the United States, under 35 U.S.C. 101) computer-readable mediums, and to specifically exclude mediums that are non-statutory in nature to the extent exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102, the posture detection system 104, the posture-aware content presentation system 106, the posture-aware coaching system 108, and other applicable systems or devices described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can include, for example, a central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 1, the posture detection system 104 is intended to represent a set of sensors and a sensor data gathering engine. In a specific implementation, the posture detection system 104 includes sensors positioned on 10 different parts of the body, two on each arm and leg and one on the head and torso. The set of sensors are configured in such a way that the data provided from the sensors is useful in determining the posture of a human being. For example, sensors can be located on the head, arms, and legs of a human being such that when, e.g., an arm moves, the location of the arm can be tracked by comparing recent movement data associated with the arm and current movement data associated with the arm. As used in this paper, movement data is data that is generated in response to movements or positions of portions of a user's body and can be used to describe the user's movement, postures, and/or positions. In a specific implementation, the head sensor is implemented on a device that can be affixed to the head using an applicable technology, such as a technology used to affix earpieces to an ear or headphones to a head. In a specific implementation, the arm sensors can be affixed to each arm using an applicable technology, such as VELCRO® arm straps, a bracelet, a ring, or the like. It may be desirable to locate two sensors on each arm, one above and one below the elbow, to provide more precise data regarding the position of the arm and/or to locate one or more sensors on the hand. In a specific implementation, leg sensors can be affixed to each leg using an applicable technology, such as VELCRO® thigh straps, shin guards, shoes, or the like. It may be desirable to locate two sensors on each leg, one above and one below the knee, to provide more precise data regarding the position of the leg and/or to locate one or more sensors on the foot. It may also be desirable to provide multiple sensors on the torso.

In a specific implementation, multiple sensors are provided in an applicable garment, such as a shirt, pants, or body suit. The garment should be relatively tight-fitting so as to provide more accurate measurements. For example, if an arm sensor is implemented on the sleeve of a gi, an activity of the person wearing the gi or a sparring partner could cause the sleeve of the gi to be twisted around, making it appear as if the arm moved where it did not. In an alternative, at least some sensors (e.g., optical sensors or motion detection sensors) can be located off of a person's body.

In a specific implementation, the posture detection system 104 functions to capture the posture a person over a period of time. Although movement can encompass traversal of a distance over time, movement as used in this paper is intended to represent a function of posture over time, or p(t). Other types of movement can be detected as part of a system that also detects posture, such as a system that helps a runner improve posture and form when running, and also tracks acceleration, speed, and/or distance run. Where movement is intended to encompass more than p(t), the movement can be referred to as movement in space.

Although sensors typically provide data at an instant in time, the posture detection system 104 can capture movement in real-time as a person's posture changes. For example, if a ballerina raises her right arm, the posture detection system 104 can determine, as the ballerina raises their right arm, that the ballerina is raising their right arm by comparing a previous movement data associated with the right arm to a current movement data associated with the right arm. Thus, movement data associated with posture can be provided by the posture detection system 104 or the posture detection system 104 can compute p(t) to provide "movement data." Unless there is need to distinguish between instantaneous posture and p(t), or movement, the terms posture and movement will henceforth be used interchangeably.

Depending upon implementation-specific or other considerations, one or a plurality of sensors positioned on a part of a body alone or in combination can provide orientation of the respective part of the body along an x axis, a y axis, and a z axis. Further depending upon implementation-specific or other considerations, a sensor positioned on a head of a person can include a speaker and/or a microphone, through which the person can receive or transmit. Examples of sensors of the posture detection system 104, include accelerometers, gyroscopes, and force sensors.

In an example of use, sensors in the posture detection system 104 move (or detect movement if the sensor itself is not moved) over time to change alignment. For example, a sensor can be associated with the lower arm of a person in a first alignment and associated with the upper arm of a person in a different alignment. Depending upon implementation-specific or other considerations, an alignment of sensors in the posture detection system 104 can depend on a specific article of clothing a person of the posture detection system 104 is using. For example, if a person of the posture detection system 104 is performing a "T-Pose," in a shirt manufactured by NIKE®, the alignment of sensors in the posture detection system 104 can be different than an alignment of the sensors if the person is performing a "T-Pose," in a shirt manufactured by ADIDAS®. Further depending upon implementation-specific or other considerations, an alignment of sensors in the posture detection system 104 can depend on gender, size, body shape, or activity type, to name a few. For example, an alignment of sensors in the posture detection system 104 can be different based on whether a person male or a female. Alignment can enable more precise determinations of appropriate posture for a given person in a given situation.

In a specific implementation, the posture detection system 104 functions to determine an identification of a product. In being used to determine an identification of a product, sensors can be paired with the product. Depending upon implementation-specific or other considerations, the posture detection system 104 can determine an identification of a product using an alignment of sensors. For example, if sensors are aligned a specific way with a specific product, then the posture detection system 104 can determine that the specific product is being used if the sensors are aligned in the specific way. Further depending upon implementation-specific or other considerations, the posture detection system 104 can determine an identification of a product according to an electronic identifier of the product. For example, a product can include a radio frequency identification (hereinafter referred to as "RFID") chip or a near field communication (hereinafter referred to as "NFC") chip inserted into the product, for use in generating an electronic identifier by the posture detection system 104. Further in the example, the posture detection system 104 can include a receiver for receiving a signal, used in generated an electronic identifier, from an RFID chip or an NFC chip. In an alternative, the posture detection system 104 determines a product from a signature or from an identifier provided by some other engine of the posture detection system 104.

In a specific implementation, the posture detection system 104 functions to generate product insight data of a product used by a person. The posture detection system 104 can generate user based on movement data. User data generated by the posture detection system 104 can include a date of a workout, a time at which a workout occurs, duration of a workout, activities performed during a workout, and time between washes of the product. For example, the posture detection system 104 can determine, a duration of a workout of a person using a product is 2 hours if the person begins moving, while using the product, at 1:00 and stops moving at 3:00. The user data can be derived entirely from data received from sensors or obtained through some other channel, such as input from a user through a web interface or an app on a smartphone. For example, a user of the posture detection system 104 can have an app installed on a smartphone, which accepts as input a start time and an end time for a workout, provides instructions to the user as the workout progresses and asks for feedback after the workout is complete, or the like.

In a specific implementation, the posture detection system 104 maintains a movement datastore. The posture detection system 104 can match p(t) of a user to p(t) in the movement datastore and take appropriate action when the match is made, which can include matching user p(t) to stored p(t) multiple times in a row, which can indicate a user has mastered a particular movement or form. One example of an appropriate action could be that posture detection system 104 sends or other otherwise makes accessible user data to a manufacturer, designer, and/or distributor of a product. For example, generated user data can be made accessible by the posture detection system 104 through a web portal. In an alternative, the posture detection system 104 can include a product datastore that includes cross-references between p(t) and products. For example, if a user has used posture that falls within acceptable parameters for a number of yoga workouts, a more advanced yoga video can be recommended to the user. Depending upon implementation-specific or other considerations, user data can be utilized to reward a user of a product. For example, a user of a product can be rewarded after they have worn a product 100 times, as determined from generated user data.

In a specific implementation, the posture detection system 104 functions to organize user data according to market segments. The posture detection system 104 can organize user data into market segments according to demographic, psychographic, geographic, and behavioristic characteristics. For example, the posture detection system 104 can utilize user data including p(t) and an associated product with women having high self-esteem who live in San Francisco and are known to have purchased a LULU LEMON® garment. User data, generated by the posture detection system 104, can be utilized to target potential consumers of a product. For example, if a product is worn amongst a certain threshold of consumers within a specific demographic, as indicated by product insight data, then the product can be advertised to people within the specific demographic.

In a specific implementation, user data generated by the posture detection system 104 includes comparative data comparing a product to other products. Comparative data, included as part of user data, can include an identification of other products, an identification of products based on popularity, an identification of products popular amongst a specific subset of people, and/or an identification of products popular amongst participants in specific activities. For example, comparative data can include an identification of products used by females between the ages of 18 and 34 who practice yoga. The posture detection system 104 can send or other otherwise make accessible generated comparative data to a manufacturer, designer, and/or distributor of a garment.

In a specific implementation, the posture-aware content presentation system 106 functions to manage presentation of content to a user of the posture detection system 104 based on p(t) of the user captured by the posture detection system 104. Content can include audio content and/or visual content, including pictures and videos. Content managed by the posture-aware content presentation system 106 can relate to exercise and fitness. For example content managed by the posture-aware content presentation system 106 can be an exercise video or a yoga video and include motions of an athlete or instructor in performing moves during a workout session or a yoga session. Depending upon implementation-specific or other considerations, the posture-aware content presentation system 106 can present content to a user after performing an analysis of motions made by the user. For example, if a user is making motions in executing a specific move and is performing the specific move incorrectly, then the posture-aware content presentation system 106 can select content to present to the user based on incorrect posture during all or a portion of the specific move. Further depending upon implementation-specific or other considerations, the posture-aware content presentation system 106 can determine, in real-time, content to present to a user as the user changes posture.

In a specific implementation, the posture-aware content presentation system 106 functions to determine content to present to a user based on a performance level of the user in exercising moves represented by content presented to the user. A performance level of a user can include whether a user is regressing, whether a user is advancing, or whether a user is remaining at the same level. The posture-aware content presentation system 106 can determine a performance level of a user based, at least in part, on movement data generated by the posture detection system 104. In presenting content to a user based on a performance level of the user, the posture-aware content presentation system 106 can present content non-linearly. Content can be presented non-linearly in that different portions of content within a stream of content, e.g. a video, can be displayed to a user out of the order in which the portions of content are in the stream of content. For example, if a user is regressing in executing a move, then the posture-aware content presentation system 106 can determine to present beginner content to the user in executing the move. In another example, if a user is advancing in executing moves, then the posture-aware content presentation system 106 can determine to present advance content to the user.

In a specific implementation, the posture-aware content presentation system 106 functions to generate an underlying motion track for content presented to a user. A motion track can include movement annotations of motions executed in content presented to a user. As used in this paper, movement annotations of moves include descriptions and/or thresholds of motions made in executing a move correctly. Movement annotations of a move can include terms that define the posture of the move, such as angles and orientations of limbs, back, joints, speed, acceleration, torque, momentum, steadiness, stillness, smoothness of motion, etc. in correctly executing the move. For example, movement annotations of a move can specify that a user should lift their lower right leg by ninety degrees and lower their upper body by two feet in performing a specific move. Depending upon implementation-specific or other considerations, a motion track can be generated from captured motions of a reference athlete in executing a move. For example, a motion track can be generated from captured motions of an instructor in performing moves. Further depending upon implementation-specific or other considerations, a motion track can be generated in real-time and feedback can be provided based on the motion track in the same real-time. For example, a motion track can be generated during a live broadcast and feedback can be generated for users viewing the live broadcast using the motion track and motions of the users.

In a specific implementation, an underlying motion track functions to include biological triggers. Biological triggers can include requests for biological data including breathing rates, breathing patterns, heart rates, and/or electromyography signals. For example, an underlying motion track can include a biological trigger requesting a user to submit, or attach a device for submitting a heart rate of the user.

In a specific implementation, an underlying motion track functions to include content information. Content information can include an identification of products worn by athletes who are part of content, names of athletes who are part of content, and/or locations of athletes who are part of content. For example, if content includes a video of an athlete performing poses, content information can include an identification of the athlete and products worn by the athlete in the video. Content information, included as part of an underlying motion track of content, can be used to advertise products to a user perceiving the content. For example, if a user is watching a video of a yoga session, content information in an underlying motion track of the video can be used to present an advertisement to the user of products worn by an athlete in the video.

In a specific implementation, the posture-aware content presentation system 106 functions to generate a motion track for content based, at least in part, on a library of common postures for a set of moves. A library of common moves can include a datastore storing common posture data including specifications of motions used in executing common moves, which can include a time parameter for moving from a first posture to a second posture. In generating a motion track based at least in part on a library of common moves, the posture-aware content presentation system 108 can recognize a move from content, user movement data in responses to the content, and/or movement data used to create the content, and subsequently annotate the content to create a motion track using common posture data. Depending upon implementation-specific or other considerations, common posture data can be generated based upon input received from users. For example, an instructor can add common moves to a library of moves and/or common posture data including specifications of the common moves. Common posture data can also include specifications of motions made during the execution or common errors in performing moves. For example, if a common error made by users is raising their right foot, then common motions data can include that raising a right foot is a common error.

In a specific implementation, the posture-aware content presentation system 106 functions to generate feedback for a user based on movements performed by a user, as captured by the posture detection system 104 and an underlying motion track for content presented to the user. In generating feedback for a user, the posture-aware content presentation system 106 can compare motions made by the user in executing a move, as captured by the posture detection system 104, with motions indicated by movement annotations for the move. For example, if a user is supposed to lift their leg by ninety degrees, and the user is only lifting their leg by seventy degrees, thereby performing a move incorrectly, as indicated by movement data captured by the posture detection system 104, then the posture-aware content presentation system 106 can generate feedback based on the incorrect performance of the move.

In a specific implementation, the posture-aware content presentation system 106 can generate feedback that is either or both visual feedback and audio feedback. For example, the posture-aware content presentation system 106 can send a video indicating what motions a user has incorrectly performed to a video rendering device associated with the user. In another example, the posture-aware content presentation system 106 can send an audio signal including audio of motions performed incorrectly by a user and/or how the user can correct the motions. An audio signal sent by the posture-aware content presentation system 106 can be broadcast to a user through a speaker included as part of the posture detection system 104. For example, an audio signal sent by the posture-aware content presentation system 106 can be broadcast to a user through a speaker included as part of an ear piece of the posture detection system 104.

In a specific implementation, the posture-aware content presentation system 106 can determine content to present to a user according to a training program. In determining content according to a training program, the posture-aware content presentation system 106 can manage a training program of a user. A training program can include goals of a user in athletic and/or fitness endeavors. In managing a training program of a user, the posture-aware content presentation system 106 can generate and/or modify a training program of the user. For example, if a user has regressed, the posture-aware content presentation system 106 can modify a training program to fix regressions of the user. Depending upon implementation-specific or other considerations, the posture-aware content presentation system 106 can manage a training program according to movement data received from the posture detection system 104. For example, the posture-aware content presentation system 106 can determine that a rower exhibits poor technique ("a poor drive") that is symptomatic of poor leg strength and core stability based on movement data of the rower, and subsequently modify the training program to add specific leg strength and core exercises.

In a specific implementation, the posture-aware content presentation system 106 can manage training programs of users by segmenting users. For example, if a user is a 25 year old male who is a rower, then the posture-aware content presentation system 106 can generate a training program including strenuous leg exercises. The posture-aware content presentation system 106 can segment users based on their athletic capability and performance. The posture-aware content presentation system 106 can determine athletic capability and performance based on what activities users practice, their age, their derived range of motion in joints, flexibility, derived speed, explosiveness, acceleration, the number of times they practice, and other athletic indicators. Depending upon implementation-specific or other considerations, athletic capability and performance can be specific to a sport in which a user is practicing. The posture-aware content presentation system 106 can also segment users according to their learning tendencies. Learning tendencies can include how quickly a user learns, whether a user learns better by methodically progressing through an exercise, whether a user's optimum learning modality is visual (they improve after watching a video and then practicing it), auditory (they improve best when they are coached through an exercise by being told what to do), or kinesthetic (they improve best when the instruction given to them reinforces what they should be feeling).

In a specific implementation, the posture-aware coaching system 108 provides movement data to a coach. The coach can receive the movement data in the form of a real-time feed or occasional alerts that make the coach aware of either posture in real-time or alert the coach if there are deviations in posture from that expected at a given point in time during a workout or performance. The coach can also receive movement data after-the-fact to enable the coach to provide useful feedback to a user after reviewing the historical data to refresh memory for providing feedback or prior to a next workout (e.g., to watch for issues in the upcoming workout) or spot something that was missed in real-time. It may be particularly desirable to compare p(t) of a user to a movement datastore and utilize the alert feature when coaching or instructing multiple users simultaneously.

The posture-aware coaching system 108 can act as a conduit for a coach to provide feedback to a user or it can serve as an agent of the coach that acts independently (e.g., by generating alerts when p(t) of a user deviates from a p(t) datastore by an acceptability threshold) or when prompted (e.g., to find a video that addresses an issue the coach identifies). In generating feedback, the posture-aware coaching system 108 can generate, e.g., audio feedback based on input received from a coach. For example, the posture-aware coaching system 108 can provide a coach an interface to the movement data of a user, which the coach can use to watch p(t) of a user and provide coaching. Input received from a coach for generating feedback can include that one or a plurality of users are incorrectly performing moves, changes that need to be made in order to correctly perform moves, reinforcement that one or a plurality of users are correctly performing moves, and/or instructions for further moves users should perform. Depending upon implementation-specific or other considerations, the posture-aware coaching system 108 can provide audio feedback to a user through an earpiece worn by the user. Further depending upon implementation-specific or other considerations, the posture-aware coaching system 108 can be used to provide feedback to a plurality of users in a group setting.

Figure 2:
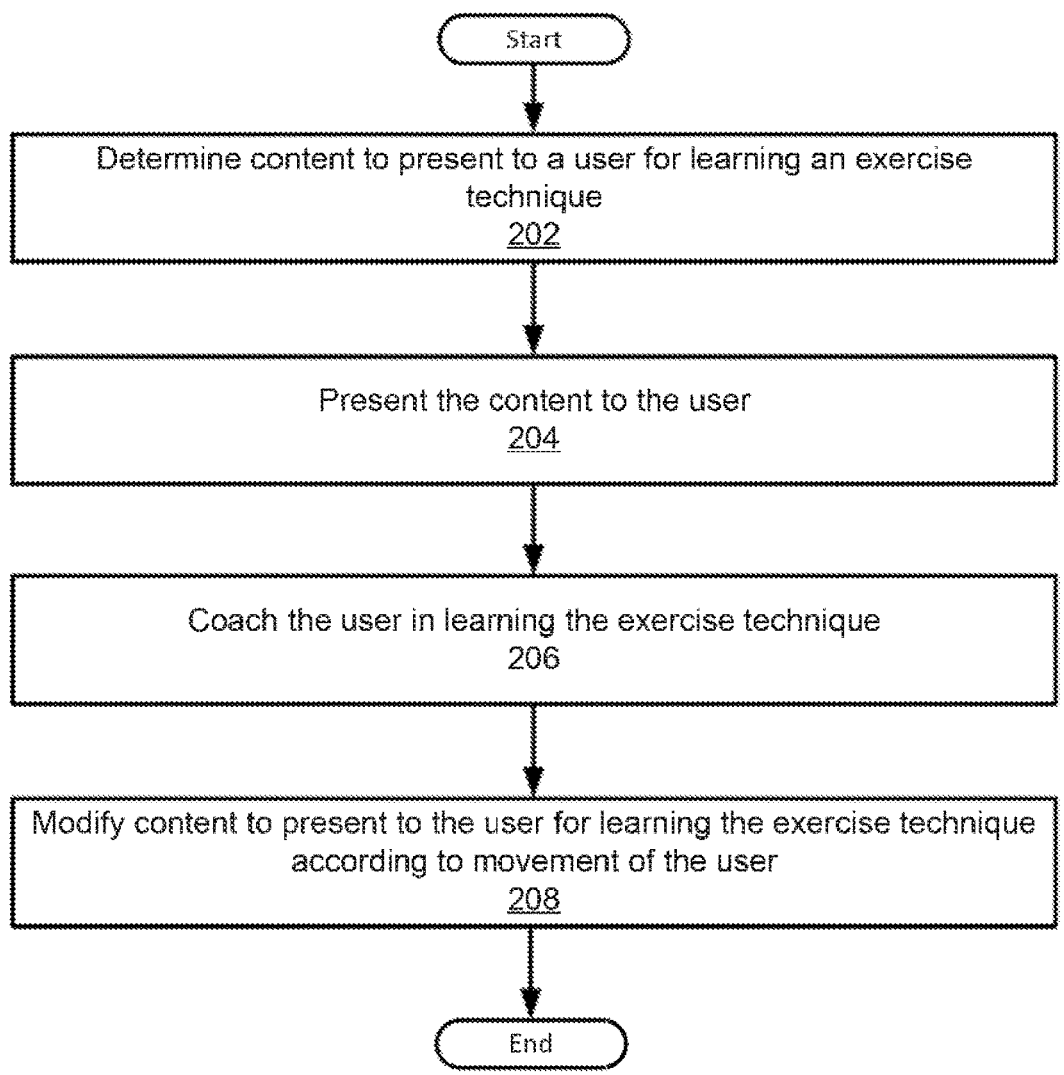
FIG. 2 depicts a flowchart of an example of a method for teaching an exercise technique to a user based on detected movements of the user.

FIG. 2 depicts a flowchart 200 of an example of a method for teaching an exercise technique to a user based on detected movements of the user. The flowchart 200 begins at module 202, where content to present to a user for learning an exercise technique is determined. Content to present to a user can be determined based on a classification into which a user is segmented. For example, if a user is segmented into a classification as intermediate for learning kata, then content presented to intermediate practitioners of kata can be determined.

The flowchart 200 continues to module 204, where the content is presented to the user. The content can be presented to the user utilizing a device through which the user can perceive content. For example, the content can be presented to a user through an image rendering device, if the content includes images, and/or the content can be presented to a user through a sound rendering device, if the content includes audio. As a specific example, content can be presented to a user via a smartphone with a content presentation application implemented thereon. Advantageously, the content presentation application can also provide other services, such as a workout scheduling program.

The flowchart 200 continues to module 206, where the user is coached in learning the exercise technique. The user can be coached based on p(t) of the user in performing an exercise technique. For example, if the user is incorrectly lifting their leg in performing the exercise technique, then the user can be coached to not lift their leg in performing the exercise technique. The user can be coached by sending the user content for consumption by the user. For example, if the user is incorrectly lifting their shoulders, then feedback, in the form of an audio signal, can be sent to the user informing the user that they are incorrectly lifting their shoulders.

The flowchart 200 continues to module 208, where content to present to the user is modified according to movements of the user. Depending upon implementation-specific or other considerations, content to present to the user can be modified based on whether the user is regressing in learning the exercise technique, is advancing in learning the exercise technique, and/or is remaining at the same level in learning the exercise technique. For example, if the user is regressing, as determined from the movements of the user, then content to present to the user can be modified to include content for fixing the user's regression.

Figure 3:
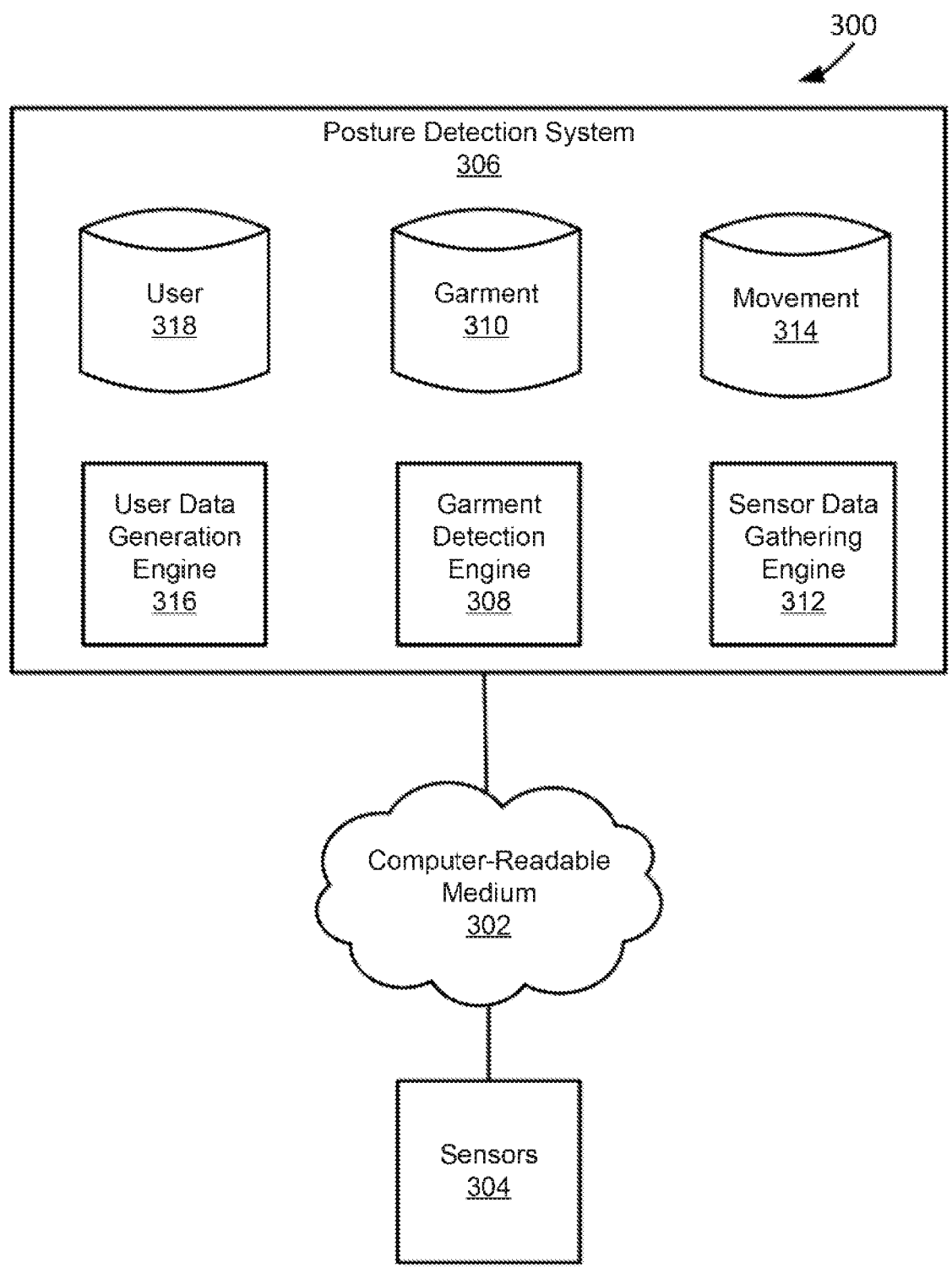
FIG. 3 depicts a diagram of an example of a posture detection system.

FIG. 3 depicts a diagram 300 of an example of a posture detection system. The example posture detection system shown in FIG. 3 includes a computer-readable medium 302, sensors 304, and a posture detection system 306.

The sensors 304 functions according to applicable sensors for detecting and generating movement data describing movements of portions of a user and postures of a user, such as the sensors described in this paper. Depending upon implementation-specific or other considerations, the sensors 304 can be implemented as part of a garment or garments worn by a user. For example, the sensors 304 can be removably secured or affixed to a garment. Further depending upon implementation-specific or other considerations, the sensors 304 can be implemented as separate from garments worn by a user. For example, the sensors 304 can be integrated as a separate top worn underneath a garment. The sensors 304 can function to generate and transmit raw movement data based on postures or movements of a user. In various implementations, the sensors 304 can include one or a plurality of wireless interfaces used to transmit generated raw movement data wirelessly. Depending upon implementation-specific or other considerations, movement data generated by the sensors 304 can indicate or be used to generate movement data of an instantaneous posture of a user or a p(t) of a user. For example, movement data generated by the sensors 304 can indicate movements of a user in maintaining a yoga pose over time.

In a specific implementation, the sensors 304 are positioned on a part of a body alone or in combination can provide orientation of the respective part of the body along an x axis, a y axis, and a z axis. Depending upon implementation-specific or other considerations, the sensors 304 are positioned on 10 different parts of the body, two on each arm and leg and one on the head and torso. The set of sensors are configured in such a way that the data provided from the sensors is useful in determining the posture of a human being. For example, sensors can be located on the head, arms, and legs of a human being such that when, e.g., an arm moves, the location of the arm can be tracked by comparing recent sensor data associated with the arm and current sensor data associated with the arm.

The posture detection system 306 functions according to an applicable system for gathering movement data from sensors, such as the posture detection systems described in this paper. The posture detection system 306 can include a wireless interface used to wirelessly receive raw movement data from sensors. The posture detection system 306 can include a wireless interface used to receive a wireless signal from a garment including a signature of the garment. The posture detection system 306 can query garment data to match a signature of a garment to match the garment to a specific garment type. As used in this paper, garment data includes applicable data describing a garment for purposes of identification of a garment, such as a signature, a maker, a type of the garment.

In a specific implementation, the posture detection system 306 pairs an identified garment worn by a user with sensors based on an identification of the garment to determine positions of the sensors on a specific user for use in determining movements or postures of the user. For example, based on an identification of a garment worn by a user, the posture detection system 306 can determine that a sensor placed on a user will be half way down the forearm of the user.

In a specific implementation, the posture detection system 306 uses gathered raw movement data to generate or modify movement data of a user. Depending upon implementation-specific or other considerations, the posture detection system 306 can generate movement data of a user based on a pairing of a garment worn by the user with sensors. Depending upon implementation-specific or other considerations, the posture detection system 306 can recognize specific moves, poses, or movements a user performs from raw movement data and generate movement data to indicate the user performed the specific moves, poses, or movements. For example, the posture detection system 306 can determine that a user is performing a T pose from raw movement data and generate movement data to indicate that the user performed a T pose.

In a specific implementation, the posture detection system 306 generates user data. User data includes applicable information of a user in interacting with the posture detection system 306. For example, user data can include specific moves, poses, or movements a user has performed, grades of a user's specific moves, poses, or movements, specific garments a user has worn, dates of workouts of a user, times of workouts of a user, durations of workouts of a user, activity of a user for each workout, a breakdown of activities of a user during a workout, times between washes of garments, most popular garments worn by a user or users in performing specific activities, groups a user is segmented into, and an experience level of a user in a specific activity.

The example posture detection system 306 shown in FIG. 3 includes a garment detection engine 308, a garment datastore 310, a sensor data gathering engine 312, a movement datastore 314, a user data generation engine 316, and a user datastore 318. The garment detection engine 308 functions to determine an identification of a garment worn by a user. The garment detection engine 308 can determine an identification of a garment worn by a user based on a received or detected signature from a garment and garment data. For example, the garment detection engine 308 can look up a received or detected signature from a garment in garment data to identify a specific type of garment associated with the signature. Depending upon implementation-specific or other considerations, the garment detection engine 308 can receive or detect a signature of a garment using an applicable wireless communication mechanism, e.g. a near field communication mechanism. For example, a garment can include an RFID chip that the garment detection engine 308 can use to detect a signature of the garment.

In a specific implementation, the garment detection engine 308 functions to query a user to determine a specific identification of a garment worn by the user. For example, the garment detection engine 308 can communicate with a user asking them to identify a garment worn by the user. Depending upon implementation-specific or other considerations, the garment detection engine 308 can query a user if either a signature of a garment is not detected or if a detected signature fails to be associated with a specific garment. For example, if the garment detection engine 308 detects a signature, but the signature does not match a specific garment in garment data, then the garment detection engine 308 can query a user. Further depending upon implementation-specific or other considerations, the garment detection engine 308 can update garment data based on a response of a user to a query. For example, if a signature does not match a specific garment and a user response identifies a specific garment, then the garment detection engine 308 can update garment data to indicate an association between the signature and the specific garment. Further in the example, the garment detection engine 308 can access an applicable source, e.g. a manufacturer, to identify further characteristics of a specific garment data to include as part of garment data.

The garment datastore 310 functions to store garment data used in identifying a specific garment worn by a user. Depending upon implementation-specific or other considerations, garment data stored in the garment datastore 110 can be retrieved from an applicable source, e.g. a manufacturer of garments. Further depending upon implementation-specific or other considerations, garment data stored in the garment datastore 110 can be generated by an applicable engine for generating garment data, such as the garment detection engines described in this paper.

The sensor data gathering engine 312 functions to gather raw movement data from sensors. The sensor data gathering engine 312 can include a wireless interface through which raw movement data is received from sensors. In various implementations, the sensor data gathering engine 312 can add timestamps to indicate when the raw movement data was either gathered or generated. Timestamps can be used to determine lengths of workouts and times at which movements or poses were performed or achieved. In various implementations, the sensor data gathering engine 312 can pair an identified garment a user is wearing with sensors to determine positions of sensors on a user. For example, in paring a garment with sensors it can be determined where the sensors will be affixed within the garment and therefore the location of the sensors on a user.

In a specific implementation, the sensor data gathering engine 312 functions to use received raw movement data to generate or update movement data for a user. The sensor data gathering engine 312 can generate or update movement data for a user according to a pairing of a garment and sensors. For example, based on the pairing of a garment worn by the user with sensors, the sensor data gathering engine 312 can determine that a sensor is on a shoulder of the user, and modify raw movement data received from the sensor to generate movement data indicating a move a user is executing based, at least in part, on the movement of the shoulder. The sensor data gathering engine 312 can add timestamps to generated or updated movement data for a user. The sensor data gathering engine 312 can use garment data describing a specific garment of a pairing to generate movement data. For example, the sensor data gathering engine 312 can determine an orientation of a sensor on a body of a wearer based on a description of a specific garment, as indicated by garment data, and subsequently determine movements of a user based on the movements of the sensor and the orientation of the sensor.

In a specific implementation, the sensor data gathering engine 312 functions to recognize specific moves, poses, or movements a user performs from raw movement data. For example, the sensor data gathering engine 312 can determine that a user is performing a T pose from raw movement data and generate movement data to indicate that the user performed a T pose. The sensor data gathering engine 312 can recognize specific moves, poses, or movements using a posture dictionary, which will be discussed in greater detail later. In recognizing specific moves, poses, or movements a user performs, the sensor data gathering engine 312 can generate movement data indicating that a use performed the specific moves, poses, or movements. For example, if the sensor data gathering engine 312 determines a user performed a T pose from raw movement data using activity data, then the sensor data gathering engine 312 can generate movement data indicating that the user performed a T pose and timestamps indicating a time period in which the user performed the pose.

The movement datastore 314 functions to store movement data. Depending upon implementation-specific or other considerations, the movement data 314 can store raw movement data received from sensors. Further depending upon implementation-specific or other considerations, the movement datastore 314 functions to store movement data generate based on raw movement data. For example, the movement datastore 314 can store movement data indicating that a user performed a specific pose.

The user data generation engine 316 functions to generate user data for a user. The user data generation engine 316 can generate user data for a user based on raw movement data and/or movement data generated for the user. For example, the user data generation engine 316 can generate user data indicating a specific pose a user held, as indicated by movement data. In another example, the user data generation engine 316 can generate user data based on whether sensors remain affixed to a garment. For example, the user data generation engine 316 can determine the time between when a user affixed sensors to a garment and removed them to determine a wearing time between washes of the garment.

In a specific implementation, the user data generation engine 316 functions to generate user data for a user based, at least in part, an identification of a garment of the user. For example, the user data generation engine 316 can generate user data indicating that a user wore a specific garment when performing specific exercises or activities. Depending upon implementation-specific or other considerations, the user data generation engine 316 can utilize garment data to generate the user data. For example, the user data generation engine 316 can utilize garment data to generate user data indicating a maker of a specific garment worn by a user in performing specific exercises or activities.

In a specific implementation, the user data generation engine 316 functions to determine dates, times, and/or durations at which a user performed poses or movements. The user data generation engine 316 can determine dates, times, and/or durations at which a user performed poses or movements based on timestamps of movement data. For example, the user data generation engine 316 can determine when a user started performing a workout based on a first timestamp included as part of movement data and determine when a user ended a workout based on a second timestamp included as part of movement data to determine a duration of a workout. In another example, the user data generation engine 316 can determine when a user started performing a pose based on a first timestamp included as part of movement data and determine when a user ended performing a pose based on a second timestamp included as part of movement data to determine a p(t).

The user datastore 318 functions to store user data related to movements and postures of a user. Depending upon implementation-specific or other considerations, the user datastore 318 can store user data generated based on garment data of a garment paired with a user and sensors. For example, the user datastore 318 can store user data indicating one or a plurality of garments a user has worn. Further depending upon implementation-specific or other considerations, the user datastore 318 can store user data generated based on movement data. For example, the user datastore 318 can store user data indicating poses a user has performed, as indicated by movement data.

In a specific implementation, user data stored in the user datastore 318 is used in the application of analytics. Depending upon implementation-specific or other considerations, user data stored in the user datastore 318 can be made available through a portal. For example a manufacturer of a garment can determine which users are wearing their clothing based on user data stored in the user datastore 318. Further depending upon implementation specific or other considerations, user data stored in the user datastore 318 can be utilized to target users for particular garments. For example, if a user who wears a garment is an expert in yoga, then user data can be utilized to advertise the garment to other practitioners of yoga. Depending upon implementation-specific or other considerations, user data stored in the user datastore 318 can be utilized to suggest products lines of products to present to a user.

In an example of operation of the example system shown in FIG. 3, the sensors 304 capture raw motion data of motions and posture of a user. In the example of operation of the example system shown in FIG. 3, the garment detection engine 308 determines an identification of a specific garment worn by a user in performing the motions and posture using a signature and garment data stored in the garment datastore 310. Further, in the example of operation of the example system shown in FIG. 3, the sensor data gathering engine 312 pairs the garment worn by the user with the sensors 304. In the example of operation of the example system shown in FIG. 3, the sensor data gathering engine 312 generates and/or updates motion data based on gathered raw data from the sensors 304 and the pairing of the garment with the sensors 304. Additionally, in the example of operation of the example system shown in FIG. 3, the movement datastore 314 stores the motion data generated and/or updated by the sensor data gathering engine 312. In the example of operation of the example system shown in FIG. 3, the user data generation engine 316 generates user data for the user using movement data stored in the movement datastore 314 and garment data stored in the garment datastore 310. Further, in the example of operation of the example system shown in FIG. 3, the user datastore 318 stores user data generated by the user data generation engine 316.

Figure 4:
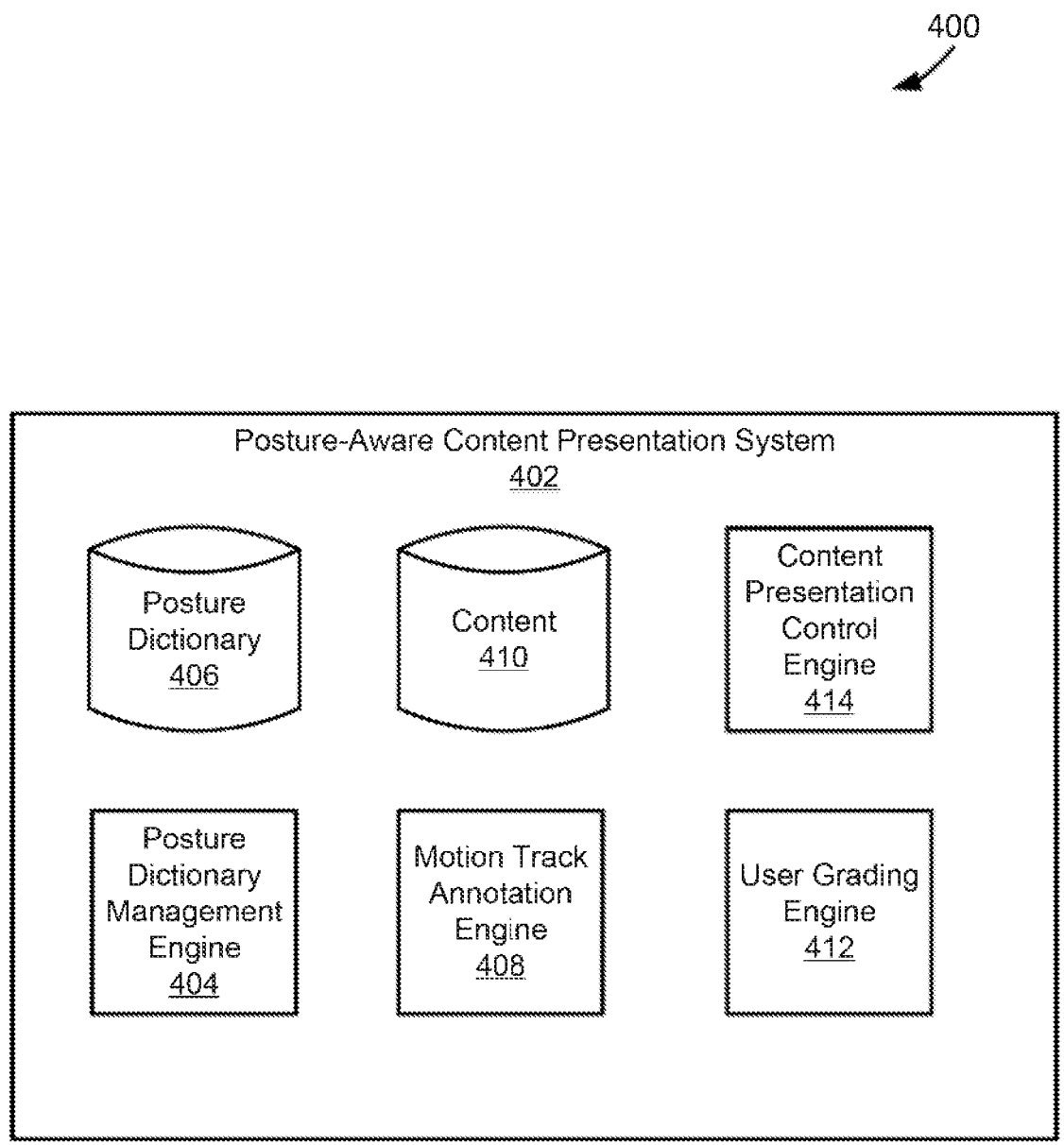
FIG. 4 depicts a diagram of an example of a posture-aware content presentation system.

FIG. 4 depicts a diagram 400 of an example of a posture-aware content presentation system 402. The example posture-aware content presentation system functions according to an applicable system for presenting content to a user based on postures and movements of the user, such as the posture-aware content presentation systems described in this paper. In a specific implementation, the posture-aware content presentation system 402 can maintain a posture dictionary. A posture dictionary includes applicable data related to movements and positions of a user and portions of a user in performing exercises and poses. For example, a posture dictionary can include movements and positions for correctly performing exercises and poses, such as angles and orientations of limbs, back, joints, speed, acceleration, torque, momentum, steadiness, stillness, smoothness of motion. A posture dictionary can also include common errors, regressions, and exercises or poses to practice if a common error is occurring. For example, a posture dictionary can indicate that if a user is not keeping their back straight on pushups to drop their knees to the floor. A posture dictionary can include movements and positions a user should perform as they progress in an exercise or pose. For example, if a user is performing pushups correctly, then the posture dictionary can indicate to lift one foot off the floor and move it out to the side as the user performs pushups.

In a specific implementation, the posture-aware content presentation system 402 functions to annotate content with a motion track. The posture-aware content presentation system 402 can annotate content with a motion track according to a posture dictionary. For example, if content is for performing pushups, the posture-aware content presentation system 402 can include in the motion track proper forms for performing pushups.

In a specific implementation, the posture-aware content presentation system 402 functions to grade a user as they are performing movements or poses and present content to the user according to the grades. In various implementations, the posture-aware content presentation system 402 can grade a user in real-time based on raw movement data generated by applicable sensors, such as the sensors described in this paper. In presenting content to users according to grades, the posture aware-content presentation system 402 can make linear content into non-linear content. For example, if content is a series of exercises that build off of each other and get progressively harder, and a user fails to properly perform the second exercise, then the posture aware-content presentation system 402 can cause the first exercise to be replayed.

The example posture-aware content presentation system 402 shown in FIG. 4 includes a posture dictionary management engine 404, a posture dictionary 406, a motion track annotation engine 408, a content datastore 410, a user grading engine 412, and a content presentation control engine 414. The posture dictionary management engine 404 functions to manage a posture dictionary. In managing a posture dictionary, the posture dictionary management engine 404 can generate and update a posture dictionary. Depending upon implementation-specific or other considerations, the posture dictionary management engine 404 can gather data in building a posture dictionary from an applicable public source. For example, the posture dictionary management engine 404 can search the Internet for data describing proper form in performing a pushup.

In a specific implementation, the posture dictionary management engine 404 functions to build a posture dictionary based on movement data and/or raw movement data generated by sensors affixed to a user. In various implementations, the posture dictionary management engine 404 can build a posture dictionary based on an expert performing exercises or poses properly. Depending upon implementation-specific or other considerations, in building a posture dictionary based on movement data and raw movement data, the posture dictionary management 404 can utilize a video of a user performing exercises and poses simultaneously with movement data and raw movement data generated as the user performs the exercises and poses to generate a posture dictionary. In one example, body position comparators are generated from raw movement data and/or movement data to indicate positions that portions of the body achieve at discrete times within a stream of the raw movement data and/or movement data. In the example, the video is played back frame by frame and expected frames that match the position comparators are determined. Further in the example, the stream of the raw movement data and/or movement data is run through and body position comparators, corresponding to a discrete time within the stream, are applied to a corresponding expected frame in the video. If the body position comparators do not match an expected frame, then that frame is flagged. In the example, the users can then perform the exercise or pose again, and the process can be repeated with modifications to position comparators until the number of failed frames reaches below a certain threshold. As a result, an accurate posture dictionary of a correct way to perform an exercise or achieve a pose can be achieved.

The posture dictionary datastore 406 functions to store posture dictionary data indicating a posture dictionary. Depending upon implementation-specific or other considerations, posture dictionary data stored in the posture dictionary datastore 406 can be gathered from an applicable public source. For example, posture dictionary data stored in the posture dictionary datastore 406 can include proper form of performing a pushup as determined by accessing sources across the Internet. Further depending upon implementation-specific or other considerations, posture dictionary data stored in the posture dictionary datastore 406 can be generated based on movement data and/or raw movement data generated of a user in performing an exercise or a pose. For example, posture dictionary data stored in the posture dictionary datastore 406 can be generated by applying position comparators, generated from a stream of raw movement data and/or movement data, to frames within a video taken as a user performed an exercise or achieved a pose.

The motion track annotation engine 408 functions to add a motion track to content. In various embodiments, content can be created from video of a user in generating a posture dictionary. For example, content can be generated from video or videos of an expert, taken in building the posture dictionary to demonstrate proper technique, positions, and movements to make in performing an exercise or achieving a pose. The motion track annotation engine 408 can add a motion track including movement annotations of moves in executing an exercise or achieving a pose properly. In various embodiments, a motion track and movement annotations can be generated from raw motion data and/or motion data of an expert used in building a posture dictionary. The motion track annotation engine 408 can add a motion track to content based on a posture dictionary. For example, the motion track annotation engine 408 can be told a specific exercise or pose represented by content, query a posture dictionary to retrieve proper movements and positions in performing or achieving the specific exercise or pose and subsequently add movement annotations to the content based on the posture dictionary. Depending upon implementation-specific or other considerations, the motion track annotation engine 408 can retrieve movement annotations directly from posture dictionary data or generate movement annotations based on the posture dictionary data.

In a specific implementation, the motion track annotation engine 408 can recognize exercises or poses in already existing content, and subsequently annotate the content with a motion track using a posture dictionary. The motion track annotation engine 408 can use an applicable mechanism for recognizing exercises or poses in already existing content, for use in annotation with a motion track. For example, the motion track annotation engine 408 can use speech recognition to determine that an instructor in content is moving into a warrior pose, and subsequently add a motion track to the content by querying a warrior pose in a posture dictionary.

In a specific implementation, the motion track annotation engine 408 functions embed content directors into content. Content directors include directors specifying which content or portions of content to play either during or after content or a portion of content is played. For example a content director can specify to play a third portion of content after a first portion of content is played. In various embodiments content directors can be embedded into a motion track annotated into content. Depending upon implementation-specific or other considerations, content directors are specific to user performance of an exercise or a pose. For example if a user fails at performing an exercise, then a content director can specify to play content for correcting a user's failures in performing the exercise. Through the use of content directors, linear content can be non-linearly presented to a user. Depending upon implementation-specific or other considerations, the motion track annotation engine 408 can add content directors to content using a posture dictionary. For example, the motion track annotation engine 408 can annotate content with content directs that indicate to direct to content for fixing common errors in performing an exercise, as indicated by a posture dictionary.

In a specific implementation, the motion track annotation engine 408 functions to embed audio directors and/or audio into content. Audio directors are directors included at specific times within content that direct specific audio to be played to a user. In various embodiments audio directors can be embedded into a motion track annotated into content. Depending upon implementation-specific or other considerations, audio directors are specific to user performance of an exercise or a pose. For example if a user successfully performs an exercise, then an audio director can specify to play a message saying "good job." In another example if a user incorrectly performs an exercise by making a common error, then an audio director can specify to play a message detailing the user of the common error they made.

In a specific implementation, the motion track annotation engine 408 functions to annotate content with a sidecar file. A sidecar file, as used in this paper, is a file that includes the motions included in the motion track in a format readable by a garment worn by a user. A sidecar file, in operation, can be downloaded previous to display of content by or streamed concurrently with the display of content to a garment. Further in operation, a sidecar file can be used by the garment to aid in correcting posture of a user. For example, a sidecar file can be used by a garment to restrict a user in movement in attaining a specific pose.

In a specific implementation, the motion track annotation engine 408 functions to encode biological signals into content. Biological signals include biological measurements of a user that can be encoded into content in real-time and subsequently presented to a user. Example biological measurements include breathing rates, breathing patterns, heart rates, and electromyography measurements. For example, a user can be wearing a heart rate monitor that provides a signal of a heart rate that can be encoded into content streamed to a user for presentation in real time.

In a specific implementation, the motion track annotation engine 408 functions to embed garment data directors into content. Garment data directors specify to display data to a user viewing content. In various embodiments garment data directors can be embedded into a motion track annotated into content. Depending upon implementation-specific or other considerations, the motion track annotation engine 408 can be told what specific garments are worn by users in content or identify which garments are worn by users in content. For example, the motion track annotation engine 408 can use image recognition to a frame of video content to recognize an identification of a garment worn by users. A garment data director can specify to display garment data, e.g. a maker and a price of a garment, and be embedded in a motion track whenever the garment is displayed in the content.

In a specific implementation, the motion track annotation engine 408 functions to add expert commentary into content. In adding expert commentary, the motion track annotation engine 408 can present a video of content to an expert. In adding expert commentary, the motion track annotation engine 408 can determine expected commentary of an expert to a video. Further in the example, the expected commentary of an expert can be compared to what the expert actually says based on input received from the expert. If the expected commentary of an expert does not match with what the expert actually says, then the motion track annotation engine 408 can flag the commentary and request that the expert repeat their commentary.

The content datastore 410 functions to store content data identifying content. Content data stored in the content datastore 410 can include content annotated with a motion track. Depending upon implementation-specific or other consideration, content stored in the content datastore 410 can include content embedded with identifiers described in this paper, e.g. content directors, audio directors, and/or garment data identifiers. For example, content stored in the content datastore 410 can include audio directors embedded into a motion track annotated into content. Further depending upon implementation-specific or other considerations, content stored in the content datastore 410 can include content encoded with biological signals of a user. For example, content stored in the content datastore 410 can include biological signals encoded in real-time and subsequently streamed to a user.

The user grading engine 412 functions to grade a user based on their movements and postures against correct movements and postures in performing exercises and/or achieving poses. Depending upon implementation-specific or other considerations, the user grading engine 412 can grade a user by comparing raw movement data, movement data generated, and/or user data generated in response to a user performing an exercises or pose to an underlying motion track annotated into content presented to a user for performing the exercise or pose. Further depending upon implementation-specific or other considerations, the user grading engine 412 can grade a user by comparing raw movement data, movement data, and/or user data to a posture dictionary. For example, the user grading engine 412 can utilize user data to determine when a user performed a movement and compare it to the corresponding time within a motion track to grade the user. The user grading engine 412 can grade a user in real-time as a user performs an exercise or pose according to content presented to a user in real-time. Depending upon implementation-specific or other considerations, the user grading engine 412 can grade a user based on whether movements or postures of a user fall within a threshold of an underlying motion track. For example, if a user moves a hand in performing a pose 50% beyond an allowable threshold amount as indicated by a motion track, then the user grading engine 412 can grade the user as failing.

The content presentation control engine 414 functions to present content to a user for use in performing an exercise or achieving a pose. Depending upon implementation-specific or other considerations, the content presentation control engine 414 can provide content for download or stream content to a display of a user. The content presentation control engine 414 can present content with an underlying motion track for use in grading a performance of a user. Depending upon implementation-specific or other considerations, the content control presentation engine 414 can present content according to a grade of a user in performing exercises or portions when viewing the content according to the underlying motion track.

In a specific implementation, the content presentation control engine 414 functions to present content to a user according to identifiers embedded into the content. Depending upon implementation-specific or other considerations, the content presentation control engine 414 can control presentation of content to a user based on an identifier embedded into the content and a grade given to a user in performing exercises and achieving postures. For example if an identifier indicates to not progress in content if a user grade does not meet a certain requirement, then the content presentation control engine 414 can replay the content until the user grade meets the certain requirement.

In a specific implementation, the content presentation control engine 414 functions to manage presentation of content according to content directors. In managing presentation of content according to content directors, the content presentation control engine 414 can present content to a user according to a grade of a user in performing an exercise or achieving a pose. For example, if a user does not achieve a pose properly according to a grade, and a content director indicates to display specific content related to achieving the pose properly, then the content presentation control engine 414 can display the specific content to the user.

In a specific implementation, the content presentation control engine 414 functions to manage presentation of content according to audio directors. In managing presentation of content according to audio directors, the content presentation control engine 414 can present content to a user according to a grade of a user in performing an exercise or achieving a pose. For example, if a user does not achieve a pose properly according to a grade, and an audio director indicates to play an audio message related to achieving a proper pose, then the content presentation control engine 414 can send or play the audio message.

In a specific implementation, the content presentation control engine 414 functions to manage display of content according to garment data identifiers. In managing display of content according to garment data identifier, the content presentation control engine 414 can present garment data to a user according to a garment data identifier. For example, if a garment data identifier indicates to display garment data to a user indicating a maker of a garment worn in content presented to a user, then the content presentation control engine can cause garment data indicating the make of the garment to be displayed to a user.

In an example of operation of the example system shown in FIG. 4, the posture dictionary management engine 404 manages a posture dictionary indicated by posture dictionary data stored in the posture dictionary datastore 406. In the example of operation of the example system shown in FIG. 4, the motion track annotation engine 408 annotates content with a motion track and embeds identifiers into the content, as stored in the content datastore 410. Further, in the example of operation of the example system shown in FIG. 4, the user grading engine 412, grades the user in performing exercises or achieving poses based on the motion track and raw movement data, movement data, and/or user data generated for the user in performing the exercises or aching poses. In the example of operation of the example system shown in FIG. 4, the content presentation control engine 414 manages presentation of the content to the user based on a grade determined by the user grading engine 412 and the directors embedded into the content.

Figure 5:
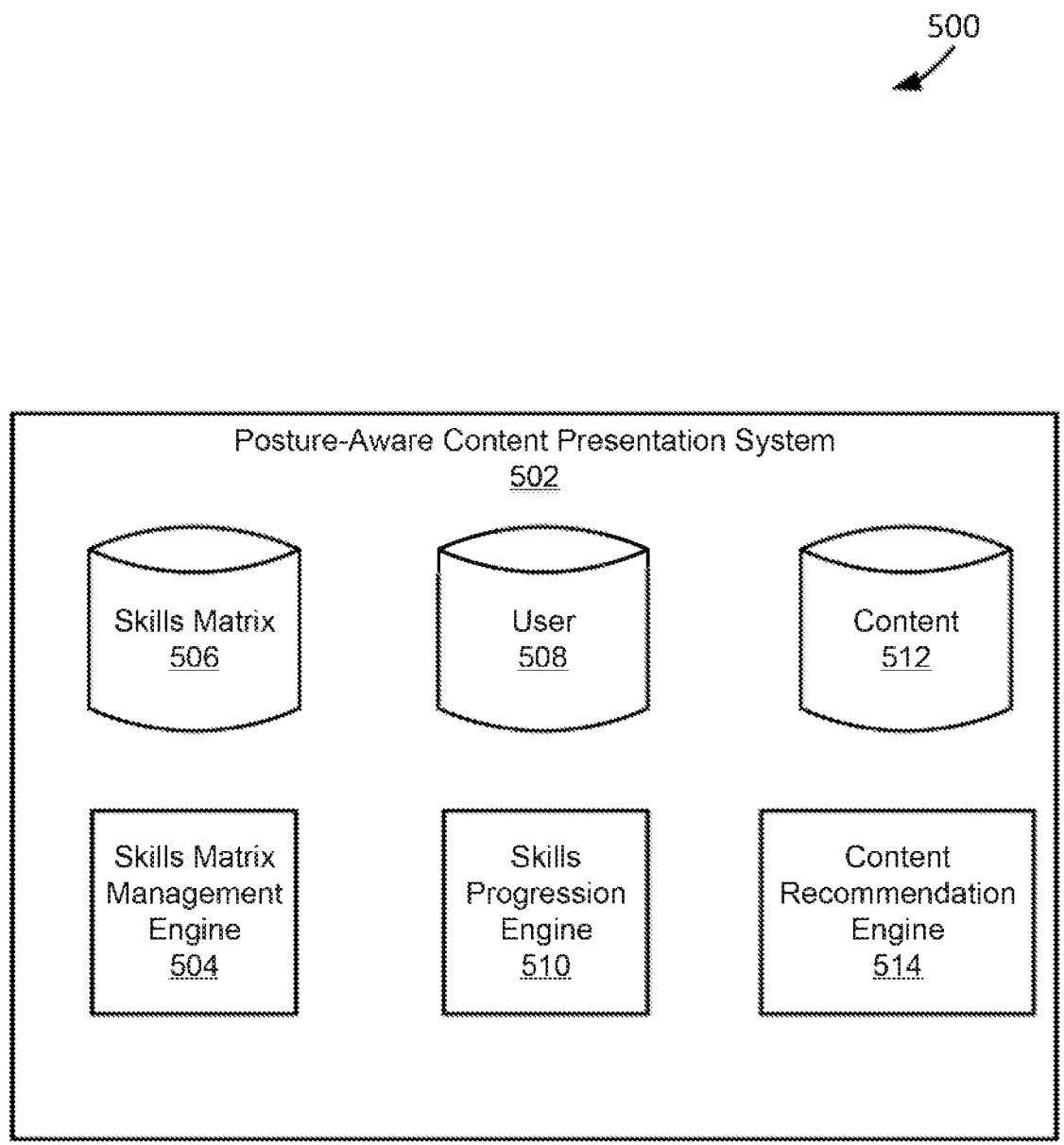
FIG. 5 depicts a diagram of an example of a posture-aware content presentation system.

FIG. 5 depicts a diagram 500 of an example of a posture-aware content presentation system 502. The example posture-aware content presentation system functions according to an applicable system for presenting content to a user based on postures and movements of the user, such as the posture-aware content presentation systems described in this paper. The posture-aware content presentation system 502 can manage a skills matrix for ranking users and determining progression within a skill, an exercise, or a pose. Depending upon implementation-specific or other considerations, the posture-aware content presentation system 502 can determine a ranking of a user within a skill, an exercise, or a pose and manage progression of the user within the skill, exercise, or pose. For example, if a user has mastered a move in yoga, then the posture-aware content presentation system 502 can advance the user from beginner to intermediate in yoga. Further depending upon implementation-specific or other considerations, the posture-aware content presentation system 502 can recommend content to present to a user. For example, the content presentation engine 514 can recommend content to a user for intermediates in yoga once it is determined that a user has advanced to intermediate in yoga.

The example posture-aware content presentation system 502 shown in FIG. 5 includes a skills matrix management engine 504, a skills matrix datastore 506, a user datastore 508, a skills progression engine 510, a content datastore 512, and a content recommendation engine 514. The skills matrix management engine 504 functions to manage a skills matrix for a particular skill. A skills matrix includes data describing proficiencies required to achieve a specific level within a particular skill. A skills matrix can include rows representing different levels within a particular skill and columns representing different proficiencies at specific moves or a set of exercises within a skill to reach a certain level within the particular skill. For example columns within a skills matrix can represent different belt levels within karate and rows can represent different moves and proficiency levels within each move required at the different belt levels. The skills matrix management engine 504 can generate or update a skills matrix according to input or data received from an applicable authoritative source. For example, the skills matrix management engine 504 can develop a skills matrix from a posture dictionary or based on input from an expert in a field of a particular skill.

In a specific implementation, the skills matrix management engine 504 functions to generate a skills matrix representing a workout. A skills matrix representing a workout can include a set of exercises or a sub-set of exercises that form a workout. A set of exercises can be identifiable by a name, e.g. "circuit set." The skills matrix can include different workouts that can be formed by a collection of sets of exercises shared by different workout levels. Each workout can be associated with a skill level within a specific skill. For example a first workout can be associated with an intermediate level skill while a second workout can be associated with an advanced skill level, as represented in columns of the skills matrix.

The skills matrix datastore 506 functions to store skills matrix data indicating a skills matrix. A skills matrix indicated by skills matrix data stored in the skills matrix datastore 506 can be used to segment or progress a user between levels of a skill. For example, a skills matrix can be used to segment a user as a brown belt, and eventually progress the user to black belt as the user gains proficiencies at different exercises and moves within karate.

The user datastore 508 functions according to an applicable datastore for storing user data, such as the user datastores described in this paper. User data stored in the user datastore 508 and the user datastores described in this paper can include information related to various skill levels users have been segmented into for various skills, how often a user practices or workouts, how quickly a user progresses between different skill levels, the best way a user learns, whether a user learns better by viewing content, practicing exercises or kinesthetically, athleticism, speed, explosiveness, acceleration, and their age. For example, user data stored in the user datastore 508 can indicate that a user is moderately athletic and learns best by practicing exercises.

The skills progression engine 510 functions to segment and advance a user in various skill levels for various skills. The skills progression engine 510 can segment and advance a user in various skill levels based on grading of a user's movements or poses by an applicable engine for grading a user, such as the user grading engines described in this paper. In various embodiments, the skills progression engine 510 can segment and advance a user based on a grade given to a user by comparing raw movement data or movement data received from sensors worn by a user to a motion track of exercises or poses performed by a user and a skills matrix. For example, the skills progression engine 510 can determine from user grades in performing karate moves that a user is a brown belt level, and subsequently segment the user into a class of users who are brown belts in karate. In various embodiments, the skills progression engine 510 can update user data to indicate a skill level to which a user has been segmented or advanced.

The content datastore 512 functions according to an applicable datastore for storing content data for use in performing exercises or achieving poses, such as the content datastores described in this paper. Content data stored in the content datastore 512 can include actual content to present to a user. In various embodiments, content data stored in the content datastore 512 and the content datastores described in this paper, content data can include data describing actual content. For example, content data can include skills that the content is for, skill levels within skills that content is for, and skills, exercises, and strength and agility content is used to improve. For example, content can include leg strength and core exercises for improving leg and core strength of a rower who is poor drive.

In a specific implementation, content data stored in the content datastore 512 is updated based on success of specific content in advancing users to different skill levels in skills. An applicable engine for grading a user, such as the user grading engines described in this paper, can modify content based on success of specific content in advancing users to different skill levels in skills. For example, if specific content has been shown to quickly correct common errors of users, then content data stored in the content datastore 512 can be updated to indicate that the specific content should be suggested to users who demonstrate the common errors.

The content recommendation engine 514 functions to recommend content to be presented to a user. The content recommendation engine 514 can recommend content based on skill levels a user has been segmented into, grades of a user in performing movements and exercises, and/or goals of a user. For example, if a user is a rower with poor drive, as indicated by grades of a user, then the content recommendation engine 514 can recommend content for improving leg and core strength. In another example, if a user indicates their goal is to run a mile in under 6 minutes, then the content recommendation engine 514 can recommend content for improving speed of a user. In various embodiments, the content recommendation engine 514 can instruct an applicable engine for managing content presentation, such as the content presentation control engines described in this paper, to present recommended content to a user.

In a specific implementation, the content recommendation engine 514 can recommend content based on user data and content data. For example, if user data indicates that a user has a brown belt in karate and content data indicates that specific content is for users with a brown belt in karate, then the content recommendation engine 514 can specify the specific content for the user.

In an example of operation of the example system shown in FIG. 5 the skills matrix management engine 504 generates a skills matrix reflected by skills matrix data stored in the skills matrix datastore 506. In the example of operation of the example system shown in FIG. 5, the skills progression engine 510 segments a user into a skill level using the skills matrix and grades of the user in performing exercises or poses. Further, in the example of operation of the example system shown in FIG. 5, the skills progression engine 510 updates user data stored in the user datastore 508 to indicate the skill level to which the user was segmented. In the example of operation of the example system shown in FIG. 5, the content recommendation engine 514 recommends content to the user based on the skill level, as indicated by user data stored in the user datastore 508, and content data stored in the content datastore 512.

Figure 6:
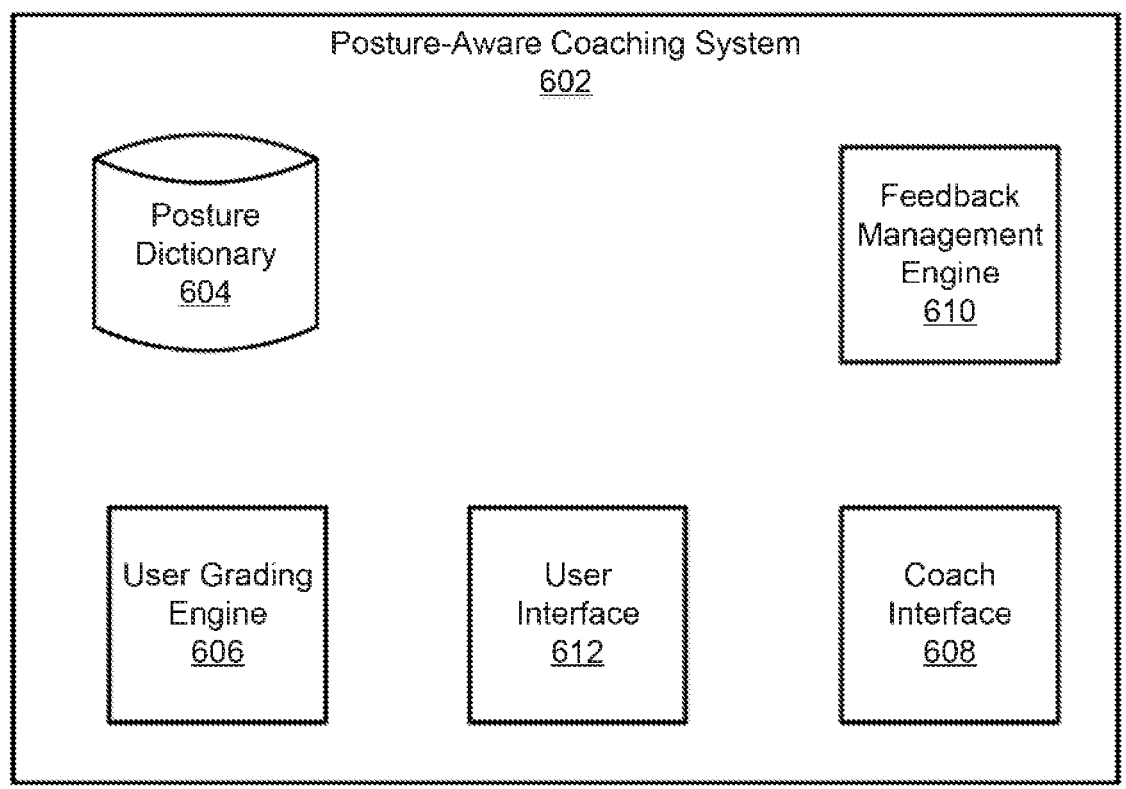
FIG. 6 depicts a diagram of an example of a posture-aware coaching system.

FIG. 6 depicts a diagram 600 of an example of a posture-aware coaching system 602. The posture-aware coaching system 602 functions according to an applicable system for providing coaching to a user based posture and movement of the user, such as the posture-aware coaching systems described in this paper. The posture-aware coaching system 602 includes interfaces through which the posture-aware coaching system 602 can interact with a coach and a user. The posture-aware coaching system 602 can receive feedback from a coach that is used in interacting with a user.

The example posture aware coaching system 602 shown in FIG. 6 includes a posture dictionary 604, a user grading engine 606, a coach interface 608, a feedback management engine 610, and a user interface 612. The posture dictionary datastore 604 functions according to an applicable datastore for storing posture dictionary data, such as the posture dictionary datastores described in this paper. Posture dictionary data stored in the posture dictionary datastore 604 can be created by an applicable system for managing a posture dictionary, such as the posture dictionary management engines described in this paper. Depending upon implementation-specific or other considerations, posture dictionary data stored in the posture dictionary datastore 604 can be generated based on movement data and/or raw movement data generated of a user in performing an exercise or a pose. For example, posture dictionary data stored in the posture dictionary datastore 604 can be generated by applying position comparators, generated from a stream of raw movement data and/or movement data, to frames within a video taken as a user performed an exercise or achieved a pose.

The user grading engine 606 functions according to an applicable engine for grading a user based on movement data or raw movement data generated for the user, such as the user grading engines described in this paper. The user grading engine 606 can grade a user by comparing raw movement data, movement data, and/or user data generated in response to a user performing an exercises or pose to an underlying motion track annotated into content presented to a user for performing the exercise or pose. The user grading engine 606 can grade a user in real-time as a user performs an exercise or pose by comparing raw movement data, movement data, and/or user data to an underlying motion track annotated to a content presented to a user in real-time. Depending upon implementation-specific or other considerations, the user grading engine 606 can grade a user based on whether movements or postures of a user fall within a threshold of an underlying motion track. For example, if a user moves a hand in performing a pose 50% beyond an allowable threshold amount, as indicated by a motion track or a posture dictionary, then the user grading engine 606 can grade the user as failing. Depending upon implementation-specific or other considerations, the user grading engine 606 and the user grading engines described in this paper, can generate grades that indicate areas a user need to improve and/or data indicating why the user failed or was given a grade. For example, the user grading engine 606 can generate grades that indicate that a user who is rowing needs to improve their core strength. The user grading engine 606 can determine areas a user needs to improve based on a posture dictionary.

The coach interface 608 functions as an interface through which a coach can interact with the posture-aware coaching system 602. The coach interface 608 can be configured to provide grades of a user, as determined from raw motion data and/or motion data of a user, to a coach. For example, the coach interface 608 can provide a grade to a coach indicating that user has failed their motion in performing rowing and need to improve in specific areas of performing rowing. In various embodiments, the coach interface 608 can be used to provide access to a posture dictionary for determining, by a coach, areas that a user needs to improve on. For example, a coach can compare movements of a user with proper movements, as indicated in a posture dictionary, to determine areas a user needs to improve.

In a specific implementation, a coach can provide feedback through the coach interface 608. Depending upon implementation-specific or other considerations, feedback can include a suggestion of content to present to a user. For example, if a user has poor form in rowing, a coach can provide feedback suggesting that a user should be presented with content to improve leg strength. Further depending upon implementation-specific or other considerations, feedback can include a message to present to a user. For example, feedback can include an audio message of encouragement if a user is performing an exercise properly.

The feedback management engine 610 functions to manage feedback provided by a coach. Depending upon implementation-specific or other considerations, if feedback is a suggestion of content, then the feedback management engine 610 can forward the feedback to an applicable engine for managing presentation of content to a user, such as the content presentation control engines described in this paper. Further depending upon implementation-specific or other considerations, if feedback is a message to present to a user, then the feedback management engine can cause the message to be presented to the user. For example, if feedback is an audio message of encouragement, then the feedback management engine 610 can send the feedback to a speaker of a user to cause the feedback to be played for the user. Depending upon implementation-specific or other considerations, the feedback management engine 610 can receive input from a user and subsequently forward the input to an applicable destination. For example, the feedback management engine 610 can receive a question a user is asking of a coach, and subsequently forward the question to the coach.

The user interface 612 functions to allow a user to interact with the posture-aware coaching system. Depending upon implementation-specific or other considerations, a user can send input through the user interface 612. For example, a user can send questions regarding exercises through the user interface 612. Further depending upon implementation-specific or other considerations, the user interface 612 can be used to provide feedback to a user. For example, a message of encouragement can be played for a user through the user interface 612.

In an example of operation of the example system shown in FIG. 6, the user grading engine 606 grades a user based on performance of exercises and achieving of poses using a posture dictionary stored as posture dictionary data in the posture dictionary datastore 604. In the example of operation of the example system shown in FIG. 6, a coach can view the grades of the user through the coach interface 608. Further in the example of operation of the example system shown in FIG. 6, the feedback management engine 610 forwards communications between the user and the coach through the coach interface 608 and the user interface 612.

Figure 7:
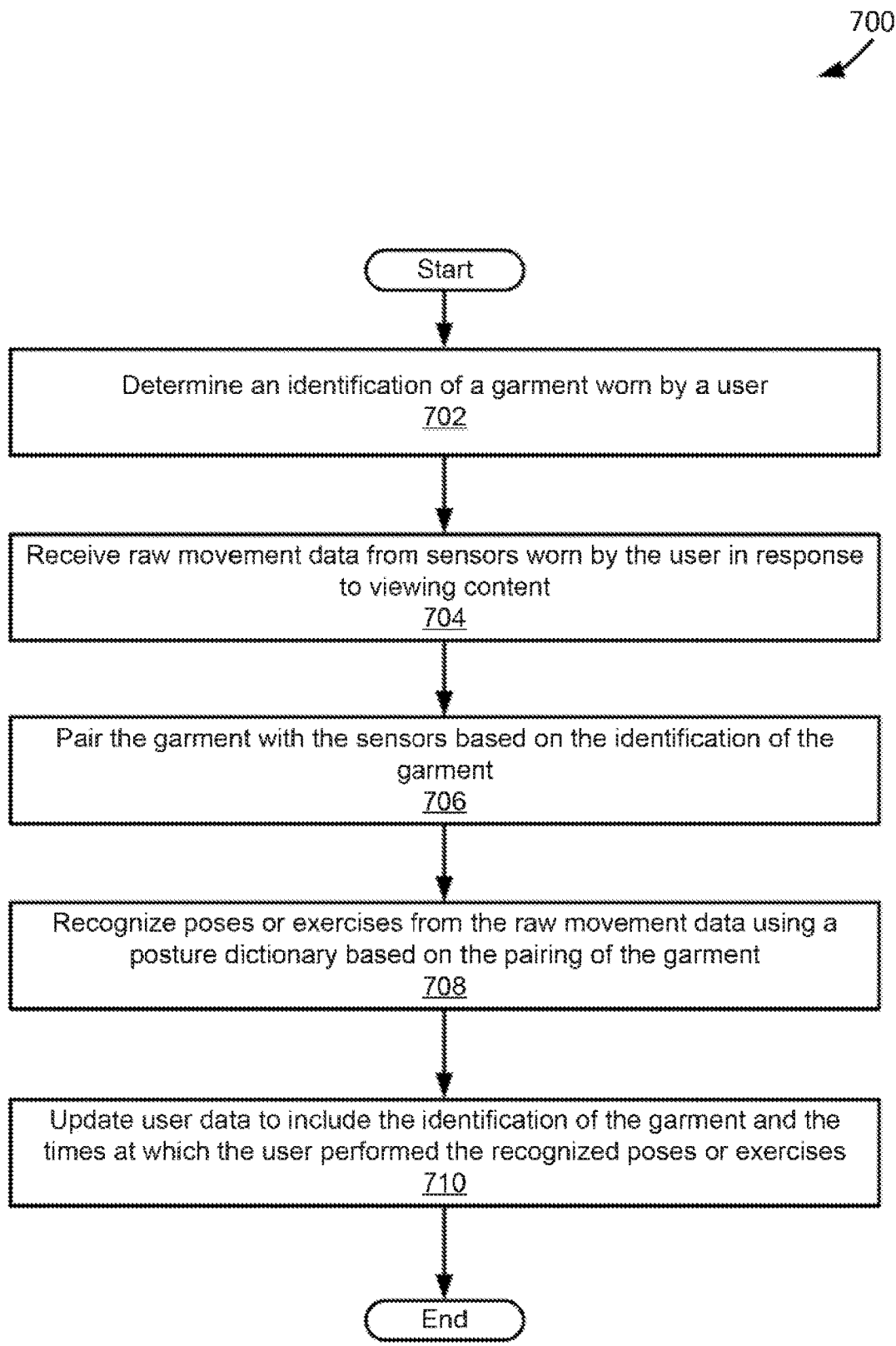
FIG. 7 depicts a flowchart of an example of an example of a method of detecting posture of a user.

FIG. 7 depicts a flowchart 700 of an example of an example of a method of detecting posture of a user. The flowchart 700 begins at module 702, where an identification of a garment worn by a user is determined. An applicable engine for detecting an identification of a garment worn by a user, such as the garment detection engines described in this paper, can determine an identification of a garment worn by a user. Depending upon implementation-specific or other considerations, an identification of a garment worn by a user can be determined based on a received or detected signature from a garment and garment data. For example, a received or detected signature from a garment can be looked up in garment data to identify a specific type of garment associated with the signature. Further depending upon implementation-specific or other considerations, an identification of a garment worn by a user can be determined by querying the user.

The flowchart 700 continues to module 704, where raw movement data is received from sensors worn by the user in response to viewing content. An applicable engine for receiving raw movement data, such as the sensor data gathering engines described in this paper, can receive raw movement data from sensors worn by the user. Received raw movement data can represent an instantaneous posture of the user or a p(t) of the user.

The flowchart 700 continues to module 706, where the garment is paired with the sensors based on the identification of the garment. An applicable engine for pairing a garment with sensors, such as the sensor data gathering engines described in this paper, can pair the garment with the sensors. In paring the garment with the sensors it can be determined where the sensors will be affixed within the garment and therefore the location of the sensors on the user.

The flowchart 700 continues to module 708, where poses or exercises performed by the user are recognized from the raw movement data using a posture dictionary based on the pairing. An applicable engine for recognizing poses and exercises in raw movement data, such as the sensor data gathering engines described in this paper, can recognize poses or exercises performed by the user from the raw movement data using a posture dictionary. For example, based on the pairing movements of the user are determined, and a posture dictionary can be utilized to determine which poses or exercises the user actually performed. In various embodiments movement data can be generated to indicate recognized poses or exercises with time stamps indicating when the poses or exercises were performed.

The flowchart 700 continues to module 710, where user data is updated to include the identification of the garment and times at which the user performed the recognized poses or exercises. An applicable engine for updating user information, such as the user data generation engines described in this paper, can update user data to include the identification of the garment and times at which the user performed the recognized poses or exercises. Times at which the user performed the recognized poses or exercises can be determined from time stamps included as part of motion data generated from the raw motion data.

Figure 8:
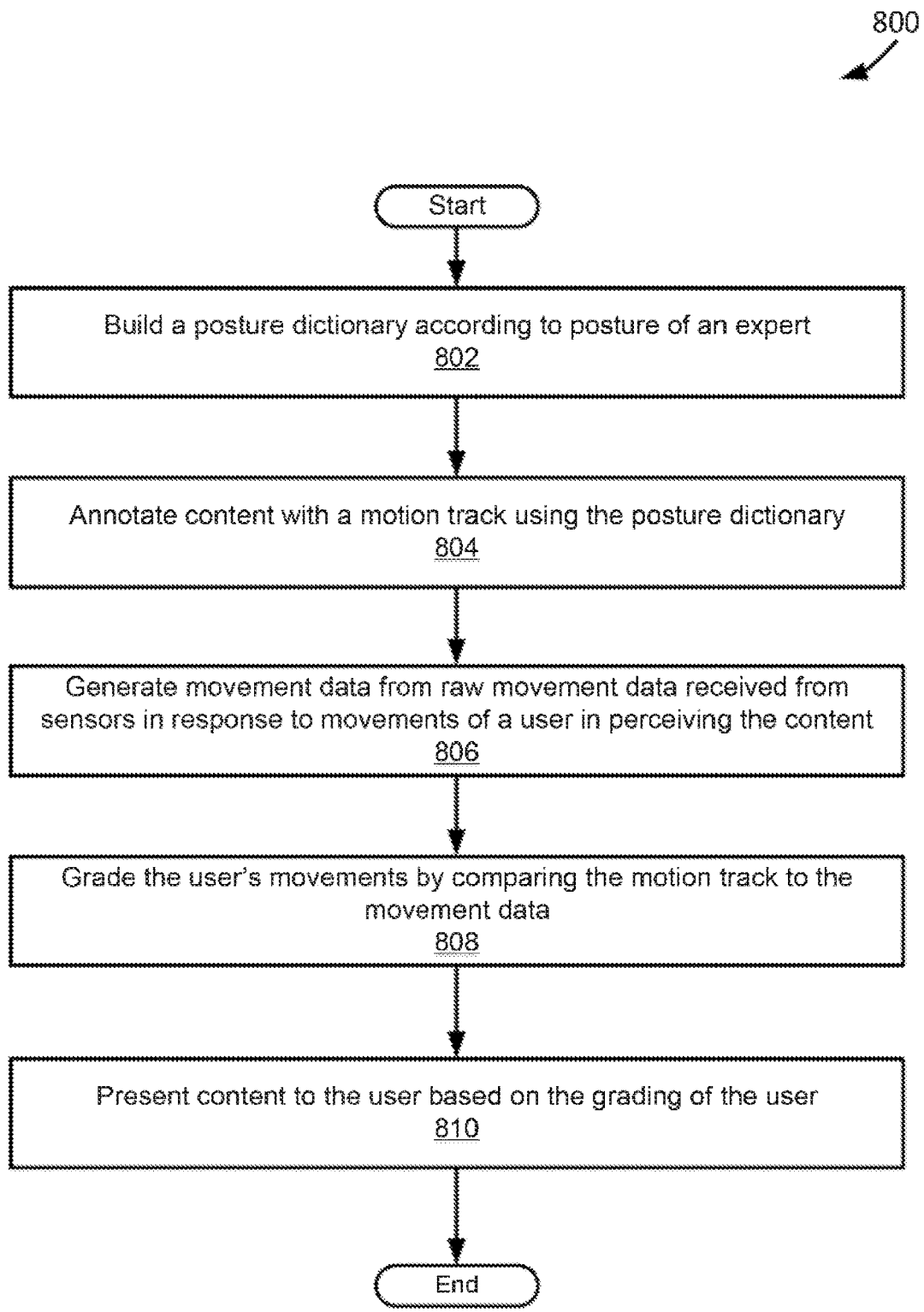
FIG. 8 depicts a flowchart of an example of a method for presenting content to a user based on posture of a user.

FIG. 8 depicts a flowchart 800 of an example of a method for presenting content to a user based on posture of a user. The flowchart 800 begins at module 802, where a posture dictionary is built according to posture of an expert. An applicable engine for building a posture dictionary, such as the posture dictionary management engines described in this paper, can build a posture dictionary according to posture of an expert. In various implementations a posture dictionary can be built based on an expert performing exercises or poses properly. Depending upon implementation-specific or other considerations, a posture dictionary can be built based on movement data and raw movement data generated by sensors affixed to an expert. Further depending upon implementation-specific or other considerations, the posture dictionary a video of a user performing exercises and poses simultaneously with movement data and raw movement data generated as the user performs the exercises and poses can be used to generate a posture dictionary.

The flowchart 800 continues to module 804, where content is annotated with a motion track using the posture dictionary. An applicable engine for annotating content, such as the motion track annotation engines described in this paper, can annotate content with a motion track using the posture dictionary. In various implementations, a motion track for content can be generated from raw motion data and/or motion data of an expert used in building a posture dictionary. Further, in various implementations, a specific exercise or pose represented by content can be identified, a posture dictionary can be queried to retrieve proper movements and positions in performing or achieving the specific exercise or pose correctly and movement annotations indicating the proper movements and positions can be added to the content to create the motion track.

The flowchart 800 continues to module 806, where movement data is generated from raw movement data received from sensors in response to movements of a user in perceiving the content. An applicable engine for generating movement data from raw movement data, such as the sensor data gathering engines described in this paper, can generate movement data from raw movement data received from sensors in response to movements of a user in perceiving the content. Movement data can be generated from a posture dictionary. For example, a posture dictionary can be queried to determine exercises or poses a user is performing.

The flowchart 800 continues to module 808 where the user's movements are graded by comparing the motion track to the movement data. An applicable engine for grading a user's movements, such as the user grading engines described in this paper, can grade the user's movements by comparing the motion track to the movement data. Depending upon implementation-specific or other considerations, a user can be graded based on whether the movements fall within a threshold of the underlying motion track, as indicated by the underlying motion track.

The flowchart 800 continues to module 810, where content is presented to the user based on the grading of the user. An applicable engine for managing presentation of content to a user, such as the content presentation control engines described in this paper, can facilitate presentation of content to the user based on the grading of the user. In various embodiments, new content can be presented to a user or the same content can be presented again to the user. For example, if the user does not achieve a pose properly according to the grade, and a content director indicates to display specific content related to achieving the pose properly, then the specific content can be presented to the user.

Figure 9:
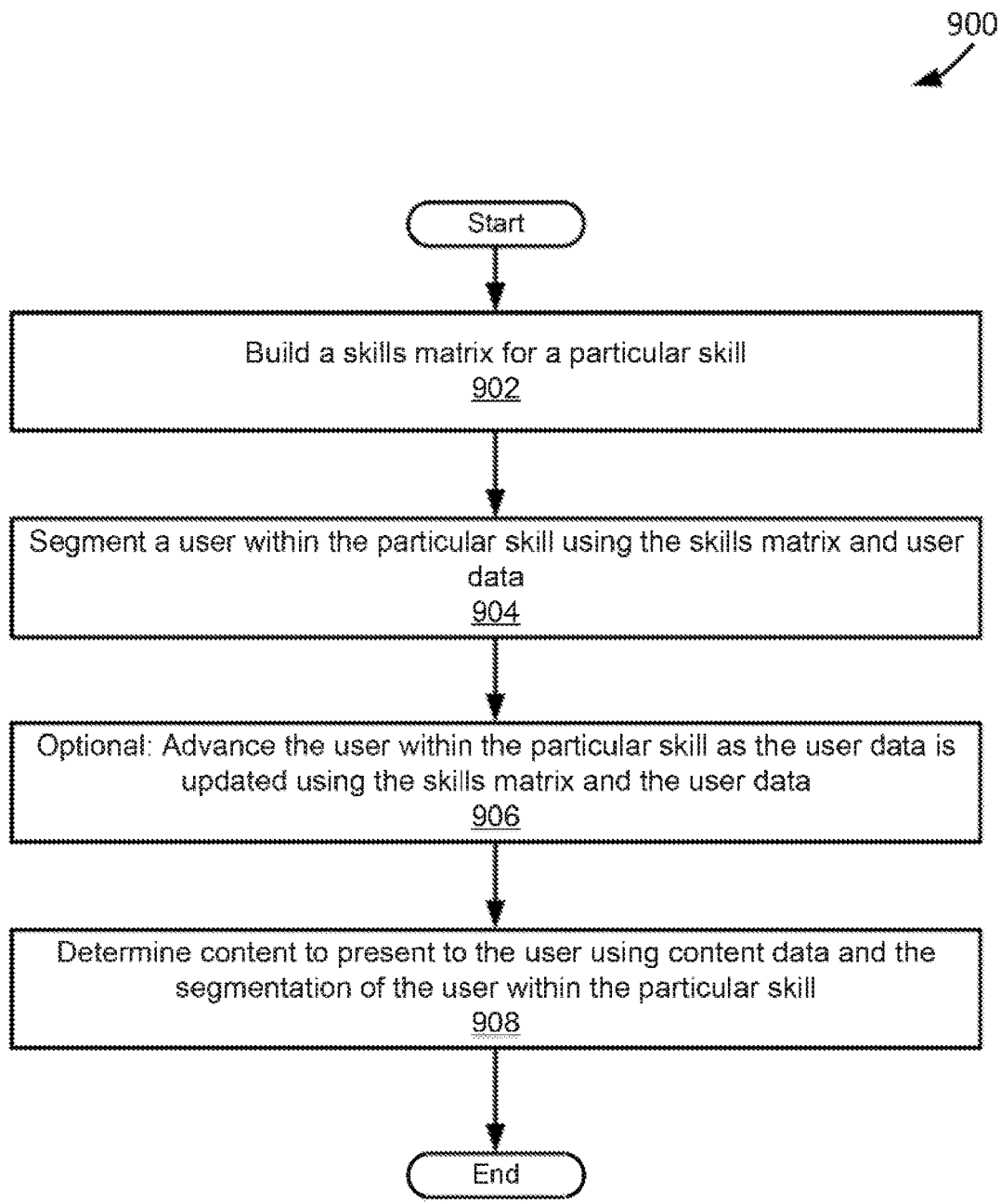
FIG. 9 depicts a flowchart of an example of a method for determining content to present to a user based on a skills matrix.

FIG. 9 depicts a flowchart 900 of an example of a method for determining content to present to a user based on a skills matrix. The flowchart 900 begins at module 902, where a skills matrix for a particular skill is built. An applicable engine for building a skills matrix, such as the skills matrix management engines described in this paper, can build a skills matrix for a particular skill. A skills matrix includes data describing proficiencies required to achieve a specific level within a particular skill. A skills matrix can include rows representing different levels within a particular skill and columns representing different proficiencies at specific moves or a set of exercises within a skill to reach a certain level within the particular skill. For example columns within a skills matrix can represent different belt levels within karate and rows can represent different moves and proficiency levels within each move required at the different belt levels.

The flowchart 900 continues to module 904, where a user is segmented within the particular skill using the skills matrix and user data. An applicable engine for segmenting a user, such as the skills progression engines described in this paper, can segment a user within the particular skill using the skills matrix and user data. A user can be segmented within the particular skill based on grading of a user's movements or poses, as indicated by user data. For example if a user passes a specific move, then the user can be segmented in a particular skill to a proficiency level that requires passing the specific move.

The flowchart 900 continues to module 906, where optionally the user is advanced within the particular skill as the user data is updated using the skills matrix and the user data. An applicable engine for advancing a user, such as the skills progression engines described in this paper, can advance the user within the particular skill using the skills matrix and the user data. The user can be advanced within the particular skill based on grading of the user's movements or poses, as indicated by updated user data. For example if a user finally is able to pass a specific move, then the user can be advanced in the particular skill to a proficiency level that requires passing the specific move.

The flowchart 900 continues to module 908, where content to present to the user is determined based the segmentation of the user within the particular skill. An applicable engine for determining content to present to a user, such as the content recommendation engines described in this paper, can determined content to present to the user based the segmentation of the user within the particular skill. For example, if the user is a rower with poor drive, as indicated by grades of a user, content for improving leg and core strength can be recommended for the user.

Figure 10:
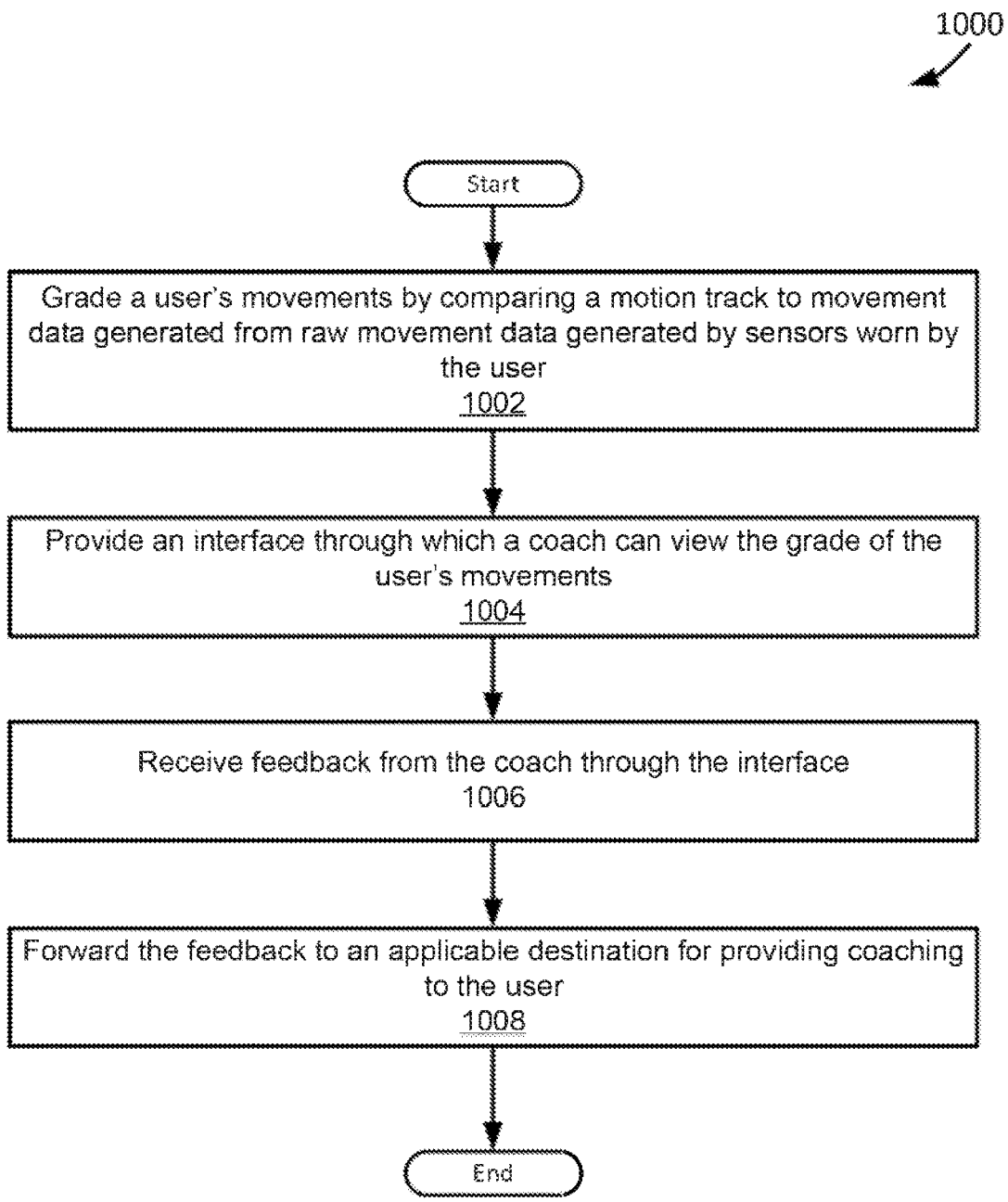
FIG. 10 depicts a flowchart of an example of a method for coaching a user based on detected posture of the user.

FIG. 10 depicts a flowchart 1000 of an example of a method for coaching a user based on detected posture of the user. The flowchart 1000 begins at module 1002, where a user's movements are graded by comparing a motion track to movement data generated from raw movement data generated by sensors worn by the user. An applicable engine for grading a user, such as the user grading engines described in this paper, can grade a user's movements by comparing a motion track to movement data generated from raw movement data generated by sensors worn by the user. Depending upon implementation-specific or other considerations, a user can be graded based on whether movements fall within a threshold of an underlying motion track annotated to content presented to the user.

The flowchart 1000 continues to module 1004, where an interface is provided to a coach through which a coach can view the grades of the user's movements. For example, a coach interface can be provided to a coach. In various embodiments, a coach can view movement data generated from the user's movements or a video of the user performing exercises or poses.

The flowchart 1000 continues to module 1006, where feedback is received from the coach through the interface. Feedback can be received in response to the coach viewing the grades of the user's movements. Feedback can include suggested content to present to the user or messages to provide to the user.

The flowchart 1000 continues to module 1008, where the feedback is forwarded to an applicable destination in providing coaching to the user. An applicable engine for managing feedback, such as the feedback management engines described in this paper, can forward the feedback to an applicable destination. For example, if feedback is content to present to the user, as suggested by the coach, then the feedback can be forwarded to an applicable engine for managing presentation of content to the user. In another example, if feedback is a message to present to the user, then the feedback can be forwarded to the user, e.g. through a user interface.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
storing reference data in a posture dictionary;
obtaining a garment identifier identifying a garment worn by a user, the garment including sensors affixed thereto;
retrieving sensor position information based on the garment, the sensor position information identifying locations of the sensors on the garment;
using the sensor position information to predict locations of the sensors on the user's body, thereby generating predicted locations of the sensors on the user's body;
gathering raw posture data generated by the sensors based on the predicted locations of the sensors on the user's body when the user performs a first exercise or pose;
determining the first exercise or pose from the raw posture data using the posture dictionary and the predicted locations of the sensors on the user's body;
evaluating the user in performing the first exercise or pose relative to the reference data; and
presenting content in view of the evaluating of the user.

2. The method of claim 1, further comprising:
updating user data of the user to identify the garment worn by the user; and
using the user data to share product information for a product to the user.

3. The method of claim 1, further comprising:
gathering expert raw posture data generated by sensors affixed to an expert performing various exercises or poses;
receiving a video of the expert performing the various exercises or poses; and
building the posture dictionary based on the expert raw posture data and the video of the expert performing the various exercises or poses.

4. The method of claim 1, wherein the presenting the content includes presenting different portions of linear content non-linearly in view of the evaluating of the user.

5. The method of claim 1, further comprising segmenting the user to a skill level for a particular skill in view of the evaluating using a skills matrix for the particular skill.

6. The method of claim 1, further comprising using a skills matrix for a particular skill to segment the user to a skill level for the particular skill in view of the evaluating of the user;
wherein the content is based on the skill level to which the user is segmented.

7. The method of claim 1, wherein the garment identifier is obtained from a signature received wirelessly from the garment.

8. The method of claim 1, wherein embedded content directors are used in presenting the content in view of the evaluating of the user.

9. The method of claim 1, wherein the content includes feedback while the user is performing the first exercise or pose.

10. The method of claim 1, wherein the content includes recommended exercises in view of the evaluating or in view of the first exercise or pose.

11. A system comprising:
at least one hardware processor;
memory storing computer instructions, the computer instructions when executed by the at least one hardware processor configured to cause the at least one hardware processor to perform:
storing reference data in a posture dictionary;
obtaining a garment identifier identifying a garment worn by a user, the garment including sensors affixed thereto;
retrieving sensor position information based on the garment, the sensor position information identifying locations of the sensors on the garment;
using the sensor position information to predict locations of the sensors on the user's body, thereby generating predicted locations of the sensors on the user's body;
gathering raw posture data generated by the sensors based on the predicted locations of the sensors on the user's body when the user performs a first exercise or pose;

determining the first exercise or pose from the raw posture data using the posture dictionary and the predicted locations of the sensors on the user's body;

evaluating the user in performing the first exercise or pose relative to the reference data; and presenting content in view of the evaluating of the user.

12. The system of claim 11, wherein the computer instructions are further configured to cause the at least one hardware processor to perform updating user data of the user to identify the garment worn by the user; and using the user data to share product information for a product to the user.

13. The system of claim 11, wherein the computer instructions are further configured to cause the at least one hardware processor to perform gathering expert raw posture data generated by sensors affixed to an expert performing various exercises or poses;

receiving a video of the expert performing the various exercises or poses; and building the posture dictionary based on the expert raw posture data and the video of the expert performing the various exercises or poses.

14. The system of claim 11, wherein the presenting the content includes presenting different portions of linear content non-linearly in view of the evaluating of the user.

15. The system of claim 11, wherein the computer instructions are further configured to cause the at least one hardware processor to perform segmenting the user to a skill level for a particular skill in view of the evaluating using a skills matrix for the particular skill.

16. The system of claim 11, wherein the computer instructions are further configured to cause the at least one hardware processor to perform using a skills matrix for a particular skill to segment the user to a skill level for the particular skill in view of the evaluating of the user; wherein the content is based on the skill level to which the user is segmented.

17. The system of claim 11, wherein the garment identifier is obtained from a signature received wirelessly from the garment.

18. The system of claim 11, wherein embedded content directors are used in presenting the content in view of the evaluating of the user.

19. The system of claim 11, wherein the content includes feedback while the user is performing the first exercise or pose.

20. The system of claim 11, wherein the content includes recommended exercises in view of the evaluating or in view of the first exercise or pose.

21. A non-transitory computer readable medium comprising instructions that, when executed by at least one hardware processor, cause the at least one hardware processor to perform:

storing reference data in a posture dictionary;

obtaining a garment identifier identifying a garment worn by a user, the garment including sensors affixed thereto;

retrieving sensor position information based on the garment, the sensor position information identifying locations of the sensors on the garment;

using the sensor position information to predict locations of the sensors on the user's body, thereby generating predicted locations of the sensors on the user's body;

gathering raw posture data generated by the sensors based on the predicted locations of the sensors on the user's body when the user performs a first exercise or pose;

determining the first exercise or pose from the raw posture data using the posture dictionary and the predicted locations of the sensors on the user's body;

evaluating the user in performing the first exercise or pose relative to the reference data; and presenting content in view of the evaluating of the user.

* * * * *